US012737556B2

(12) United States Patent
Weisz et al.

(10) Patent No.: US 12,737,556 B2
(45) Date of Patent: Sep. 15, 2026

(54) USER FEEDBACK FOR SPECIFIC PORTIONS OF RESPONSES GENERATED USING A LARGE LANGUAGE MODEL (LLM)

(71) Applicant: GOOGLE LLC, Mountain View, CA (US)

(72) Inventors: Ágoston Weisz, Zurich (CH); Cornelius Ratsch, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 283 days.

(21) Appl. No.: 18/435,750

(22) Filed: Feb. 7, 2024

(65) Prior Publication Data

US 2025/0252271 A1 Aug. 7, 2025

(51) Int. Cl.
*G06F 40/40* (2020.01)

(52) U.S. Cl.
CPC .................................... *G06F 40/40* (2020.01)

(58) Field of Classification Search
None
See application file for complete search history.

(56) References Cited

U.S. PATENT DOCUMENTS 11,176,189 B1 11/2021 Hohwald
11,520,785 B2 * 12/2022 Clarke .................... G06F 16/23
11,875,240 B1 * 1/2024 Bosnjakovic ........... G06F 40/40
2019/0220889 A1 * 7/2019 Wei .................... G06Q 30/0269
2023/0004988 A1 * 1/2023 Bhatt ..................... G06N 3/091
2024/0095455 A1 * 3/2024 Sharma .................. G16H 10/60
2024/0265204 A1 * 8/2024 Meeks .................. G06F 40/279
2025/0131020 A1 * 4/2025 Gupta .................... G06N 3/045
2025/0131190 A1 * 4/2025 Teng ....................... G06F 40/20
2025/0218057 A1 * 7/2025 Myron ................ H04L 41/0686

FOREIGN PATENT DOCUMENTS

IN 201811030218 * 2/2020

OTHER PUBLICATIONS

"ChatSearch: A Dataset And A Generative Retrieval Model For General Conversational Image Retrieval" ICLR Conference, 23 pages, dated 2024.
"Building Generative AI Responsibly" Meta. 20 pages, dated Sep. 2023.

(Continued)

*Primary Examiner* — Richemond Dorvil
*Assistant Examiner* — Alexander G Marlow
(74) *Attorney, Agent, or Firm* — Gray Ice Higdon

(57) ABSTRACT

Implementations relate to providing a user feedback mechanism that enables a user to provide feedback towards one or more specific portions of a response. The response can be generated based on processing of a user query using a generative model such as a large language model (LLM). The one or more specific portions can be a textual portion that includes textual content, and/or a media content portion that include media content such as one or more images, one or more videos, one or more audio pieces, etc. The feedback towards one or more of the specific portions of the response can be utilized in training or fine-tuning the generative model (or an additional generative model) via approaches such as supervised training or reinforced learning.

20 Claims, 10 Drawing Sheets

(56) References Cited

OTHER PUBLICATIONS

Brade et al., "Promptify: Text-to-Image Generation through Interactive Prompt Exploration with Large Language Models" arXiv:2304.09337v1 [cs.HC], 14 pages, dated Apr. 18, 2023.
European Patent Office; International Search Report and Written Opinion issued in Application No. PCT/US2025/013718; 11 pages; dated Apr. 4, 2025.
Lee, K. et al; Aligning Text-to-Image Models using Human Feedback; 20 pages; dated Feb. 23, 2023.
Playgound AI; Playground Ai Tutorial & Review; Retrieved from https://www.youtube.com/watch?v=Qmd-zolzcJw&t=59s; 12 pages; dated Apr. 2023.

* cited by examiner

RECEIVE A USER QUERY, THE USER QUERY BEING RECEIVED VIA A USER INTERFACE OF A CLIENT DEVICE 301

GENERATE, USING A GENERATIVE MODEL, A GENERATIVE RESPONSE THAT IS RESPONSIVE TO THE USER QUERY AND THAT INCLUDES AT LEAST MEDIA CONTENT TO BE RENDERED AND ONE OR MORE SELECTABLE ELEMENTS TO BE RENDERED WITH RESPECT TO MEDIA CONTENT, THE ONE OR MORE SELECTABLE ELEMENTS EACH BEING SELECTABLE AND CORRESPONDING TO A RESPECTIVE TYPE OF USER FEEDBACK THAT EVALUATES THE MEDIA CONTENT WITH RESPECT TO THE USER QUERY 303

CAUSE THE GENERATIVE RESPONSE TO BE RENDERED IN RESPONSE TO THE USER QUERY 305

CAUSE THE MEDIA CONTENT TO BE RENDERED AT THE USER INTERFACE 305A

CAUSE THE ONE OR MORE SELECTABLE ELEMENTS TO BE RENDERED AT THE USER INTERFACE AND WITH RESPECT TO THE MEDIA CONTENT 305B

RECEIVE USER INPUT THAT SELECTS ONE OF THE ONE OR MORE SELECTABLE ELEMENTS 307

DETERMINE, BASED ON THE RECEIVED USER INPUT THAT SELECTS THE ONE OF THE ONE OR MORE SELECTABLE ELEMENTS, USER FEEDBACK THAT EVALUATES THE MEDIA CONTENT WITH RESPECT TO THE USER QUERY 309

TRAIN OR FINE-TUNE THE GENERATIVE MODEL BASED ON THE USER QUERY AND THE USER FEEDBACK THAT EVALUATES THE MEDIA CONTENT WITH RESPECT TO THE USER QUERY 311

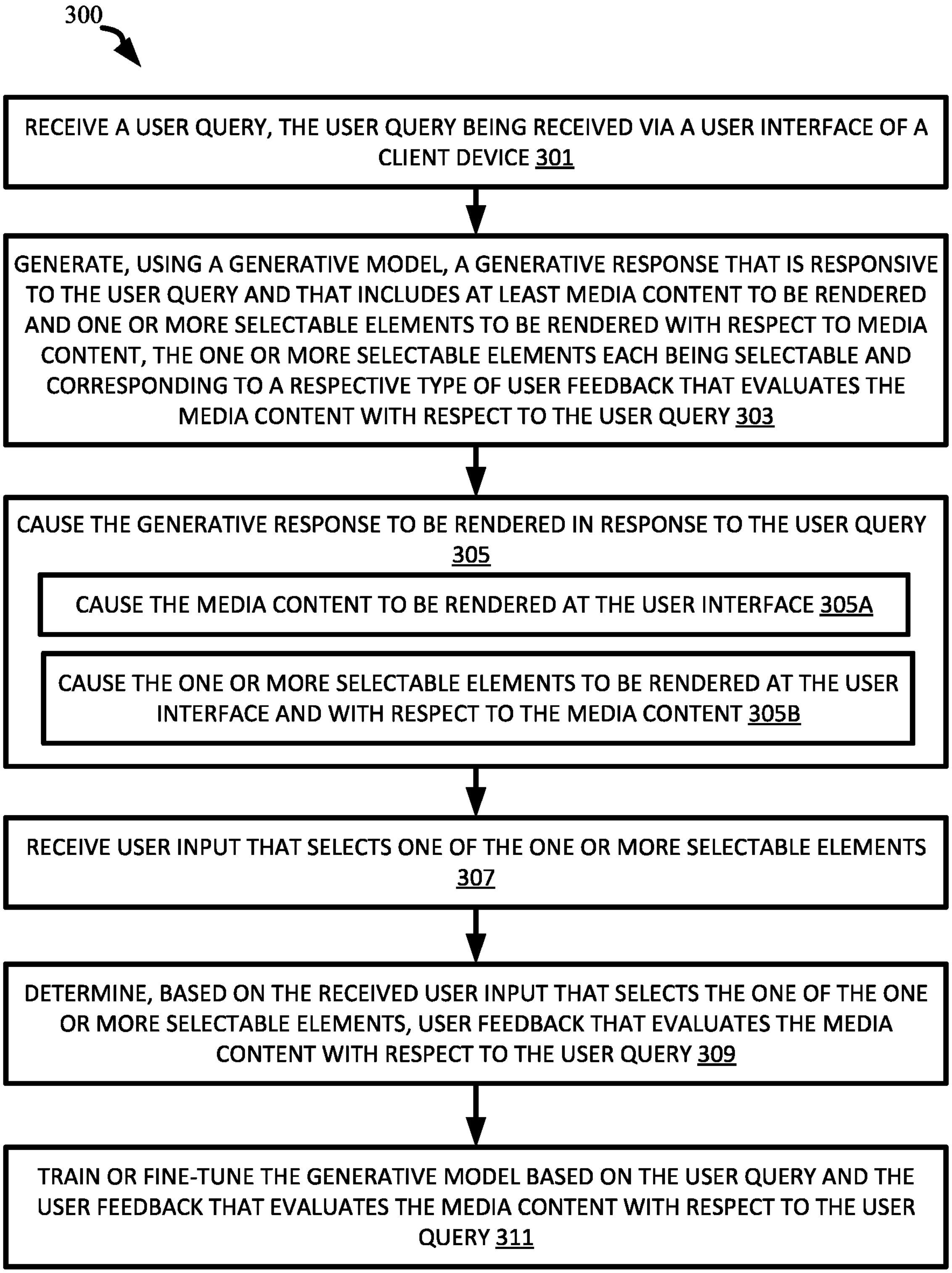

*FIG. 3*

USER FEEDBACK FOR SPECIFIC PORTIONS OF RESPONSES GENERATED USING A LARGE LANGUAGE MODEL (LLM)

BACKGROUND

Various generative models have been proposed that can be used to process natural language (NL) content and/or other input(s), to generate output that reflects generative content that is responsive to the input(s). For example, large language models (LLM(s)) have been developed that can be used to process NL content and/or other input(s), to generate LLM output that reflects generative NL content and/or other generative content that is responsive to the input(s). These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a response that is responsive to the NL based input and that is to be rendered at the client device. In many instances, these LLMs can cause textual content to be included in the response. In some instances, these LLMs can additionally, or alternatively, cause media content or multimedia content, such as images and/or videos, to be included in the response (e.g., based on causing image retrieval to be performed). The response, when including both textual content and media content, can be referred to as a multimodal response.

User feedback mechanisms have been developed recently that allow users to provide feedback towards a response as a whole. However, this user feedback is typically not granular enough to enable these LLMs to effectively learn from user feedback. For example, a user may give positive user feedback for a response having a low-resolution image based on a textual portion of the response being of satisfactory quality. As another example, the user or another user may also give negative user feedback for a response having good-quality image(s) based on a textual portion of the response being of low-quality. In situations like these, manual review/inspection of the user feedback may need to be performed to determine which specific portion of the response the user feedback is directed towards to subsequently enable these LLMs to effectively learn from the user feedback.

However, manual review can be time-consuming and can generate noisy feedback data. Insufficient manual review due to the lack of resources (e.g., not enough reviewers that are skilled in reviewing and analyzing the user feedback, limited amount of time as compared to the amount of user feedback to be reviewed, etc.) can lead to relatively low efficiencies in interpreting and understanding the user feedback. This prevents collection or generation of proper training data to fine tune, train, or reinforce generative model(s) in providing responses (e.g., multimodal responses that include both media content and textual content) of satisfying quality. If a generative model is not appropriately trained or fine-tuned, content generated using the generative model can be of low-quality, which can lead to multiple user queries in an attempt to acquire satisfactory content generated using the generative model. This elongates user interactions between the user and a computing system that implements the generative model, which results in increased consumption of computational resources, battery resources, and/or other resources such as network resources.

SUMMARY

Implementations described herein relate to providing a user feedback mechanism that enables a user to provide user feedback towards one or more portions (e.g., a natural language description, an image, a video, etc.) of a response, instead of, or in addition to, enabling the user to provide feedback towards the response as a whole. In various implementations, the response can be a multimodal response generated using a generative model (e.g., a large language model (LLM)). The multimodal response can be rendered visually at a user interface of a user device and can include, for instance, a textual portion and a non-textual portion. The non-textual portion can include media content such as an image, a video, audio, etc.

To implement the user feedback mechanism that enables a user to provide user feedback specific to a portion of the multimodal response (or otherwise a response including only textual portion(s), or including only non-textual portion (s), etc.), one or more selectable elements can be generated and rendered along with respect to the multimodal response. In some implementations, the one or more selectable elements can include positive feedback graphical user interface (GUI) element(s) (may simply referred to as "positive feedback element(s)") can be rendered over the non-textual portion(s) of the multimodal response. The positive feedback element can be selectable, and when selected, indicates that positive feedback is received from a user for the non-textual portion(s). Optionally, the positive feedback received for the non-textual portion(s) can be utilized to generate training instances to train or fine-tune the aforementioned generative model, or a different generative model.

In some implementations, additionally or alternatively, the one or more selectable elements can include negative feedback GUI element(s) (may simply referred to as "negative feedback element(s)") can be rendered over the non-textual portion(s) of the multimodal response. The negative feedback element can be selectable, and when selected, indicates that negative feedback is received from a user for the non-textual portion(s). In some implementations, in response to the negative feedback element being selected (which indicates negative feedback for the non-textual portion(s)), a feedback window can be rendered with respect to the non-textual portion (and based on which of the negative feedback element(s) is selected when the multimodal response includes multiple media content items). The feedback window can include one or more selectable options each specifying a specific type/classification of negative feedback. As a non-limiting example, the feedback window can include a first selectable option labeled as "unrelated", where the first selectable option, when selected, indicates that a user provides negative feedback for the non-textual portion(s) based on the non-textual portion(s) being "unrelated" to a user input for which the multimodal response is generated. More descriptions of the feedback window can be found below and elsewhere of this disclosure.

In some implementations, additionally or alternatively, the one or more selectable elements can include additional positive feedback element(s) that can be rendered over the textual portion(s) of the multimodal response. Similar to the positive feedback element(s) for the non-textual content portion(s), the additional positive feedback element(s) can be selectable, and when selected, indicates that positive feedback is received from a user, but with respect to the textual portion(s). Optionally, the additional positive feedback received for the textual portion(s) can be utilized to generate additional training instance(s) to train or fine-tune the aforementioned generative model, or a different generative model.

In some implementations, additionally or alternatively, the one or more selectable elements can include additional negative feedback element(s) that can be rendered over the textual portion(s) of the multimodal response. Similar to the negative feedback element(s) for the textual content portion (s), the additional negative feedback element(s) can be selectable, and when selected, indicates that negative feedback is received from a user, but with respect to the textual portion(s). Optionally, the additional negative feedback received for the textual portion(s) can be utilized to generate additional training instance(s) to train or fine-tune the aforementioned generative model, or a different generative model.

It is noted that, while the multimodal response is illustrated above as including a textual portion and a non-textual portion, in various implementations, the multimodal response can include one or more textual portions, and/or one or more non-textual portions. The one or more textual portions can be interleaved between the one or more non-textual portions. For instance, the multimodal response can include a first textual portion (e.g., an introduction in natural language), a first non-textual portion (e.g., a first image) following the first textual portion, and a second textual portion (e.g., a description of the first image) that follows the first non-textual portion. As another example, the multimodal response can include a first non-textual portion (e.g., a first image) followed by a first textual portion (e.g., a description of the first image), and a second non-textual portion (e.g., a second image) followed by a second textual portion (e.g., a description of the second image). It is noted that the total number of textual portion(s) and/or the total number of non-textual portion(s) are not limited herein.

As a working example, a multimodal response can be generated in response to receiving natural language (NL) input transcribed from a spoken utterance of a user, e.g., "can you show me some images for the year of dragon". In this working example, the multimodal response can be generated based on processing the NL input using an LLM, and can include, for instance, a textual portion such as "here are some images for the year of the dragon", a first image relating the year of the dragon, and a second image only showing a dragon.

Continuing with the above working example, to implement a user feedback mechanism that enables a user to provide user feedback specific to the first and/or second images (and in some cases, the textual portion as well), one or more selectable elements can be rendered with respect to the multimodal response. The one or more selectable elements can include, for instance, a first set of selectable elements rendered (e.g., as an overlay) with respect to the first image, and/or a second set of selectable elements rendered (e.g., as an overlay) with respect to the second image.

The first set of selectable elements rendered with respect to the first image can include, for instance, a first positive feedback element which, when selected, indicates that positive user feedback is received for the first image. Additionally, or alternatively, the first set of selectable elements rendered with respect to the first image can include a first negative feedback element which, when selected, indicates that negative user feedback is received for the first image. In case the user selects the first positive feedback element to provide positive user feedback for the first image (e.g., given that the first image relates to the year of the dragon), a training instance for training the LLM (or another generative model) can be generated (e.g., automatically).

The generated training instance can include, for instance, a training instance input (e.g., "generate image(s) for the year of dragon") the same as, or otherwise derived from, the NL input (e.g., "can you show me some images for the year of dragon" in natural language). The generated training instance can include, for instance, a tag utilized to obtain or generate the first image, as ground truth output. The generated training instance can then be utilized to train or fine-tune an LLM by: processing the training instance input using the LLM to generate a training instance output; comparing the training instance output with the ground truth output, and adjusting or fine-tuning parameters of the LLM based on comparing the training instance output with the ground truth output.

The second set of selectable elements rendered with respect to the second image can include, for instance, a second positive feedback element which, when selected, indicates that positive user feedback is received for the second image. Optionally, the second positive feedback element can have the same graphical representation as, or a different graphical representation from, the first positive feedback element. For instance, the first and second positive feedback elements can both have a graphical representation of a thumb-up symbol or other symbols (e.g., a happy face emoji) indicating positive feedback. It is noted that the first and second positive feedback elements can have different positions, e.g., one displayed as an overlay over the first image and the other displayed as an overlay over the second image.

Additionally, or alternatively, the second set of selectable elements rendered with respect to the first image can include a second negative feedback element which, when selected, indicates that negative user feedback is received for the second image. Optionally, the second negative feedback element can have the same graphical representation as, or a different graphical representation from, the first negative feedback element. For instance, the first and second negative feedback elements can both have a graphical representation of a thumb-down symbol (or a sad face emoji, etc.). It is noted that the first and second negative feedback elements can have different positions, e.g., one as an overlay over the first image and the other as an overlay over the second image.

In case the user selects the second negative feedback element to provide negative user feedback for the second image given that the second image shows a dragon but not the year of the dragon, reinforcement learning from human feedback ("RLHF") can be performed. In some implementations, in response to the second negative feedback element being selected, one or more selectable options (e.g., one or more negative feedback specifying elements) can be rendered. The one or more negative feedback specifying elements can include, for instance, a first negative feedback specifying element that when selected, indicates that the negative feedback for the second image falls within a first classification/category (e.g., image unnecessary for the multimodal response or it should have been a unimodal response (e.g., that only includes the textual content portion(s))) of negative feedback. Based on the negative feedback for the second image corresponding to the first classification of negative feedback, the LLM that is utilized to generate the multimodal response can be reinforced to not output a tag that is utilized to obtain the second image in response to the aforementioned NL input.

Additionally, or alternatively, the one or more negative feedback specifying elements can include, for instance, a second negative feedback specifying element that is selectable and when selected, indicates that the negative feedback for the second image corresponds to a second classification/category (e.g., image unrelated to the textual content portion (s) of the multimodal response) of negative feedback. Based on the negative feedback for the second image corresponding to the second classification of negative feedback, image generator(s) (or other generative models such as audio generator(s), video generator(s)) specified in LLM output of the LLM and used to generate the second image can be discarded and replaced with an updated or re-selected image generator. Additionally, or alternatively, image-requesting prompt(s) specified in the LLM output that is to be processed using the image generator(s) to generate the second image can be rewritten. The LLM can be reinforced to generate LLM output utilizing the written image-requesting prompt (s) and/or the updated image generator(s), in response to subsequent NL input or other types of user input.

In various implementations, a method implemented using one or more processors is provided, where the method includes: receiving a user query. The user query can be received, for instance, via a user interface of a client device. For instance, the user query can be a query in natural language received via an input field displayed at a graphical user interface (GUI) of an input device (e.g., a display) of the client device, where the input field receives typed input from a user of the client device that forms the query in natural language. As another example, the user query can be a query in natural language transcribed/recognized from a spoken utterance (of a user) that is received at an audible user interface of an input device (e.g., a microphone) of the client device. Descriptions of the user query, however, are not limited herein, and can be in any applicable format and include any applicable content.

In various implementations, the method further includes: generating, using a generative model, a generative response (may shortly referred to as "a response") that is responsive to the user query. The generative response can include at least media content to be rendered responsive to the user query, and/or include one or more selectable elements to be rendered with respect to the media content. The one or more selectable elements can be selectable GUI element(s) to receive user feedback for the media content (or a portion thereof). The media content can be or can include, for instance, an image, an audio, or a video. The total number of images, audio, and/or videos included in the media content, however, is not limited herein.

In some implementations, the media content can be acquired based on one or more tags included in a model output of the generative model that corresponds to the user query. For instance, the one or more tags can be utilized as search term(s) to search a media content database for image (s) or video(s) that match or respond to the search term(s). Additionally, or alternatively, the media content can be generated based on prompt(s) included in the model output of the generative model. Based on whether the user query is a query for image(s), video(s), or other types of media content, the prompt(s) can be image-generating prompt(s), video-generating-prompt(s), or other types of media-generating prompt(s). Such prompt(s) can be processed using additional generative model(s) which can be identified in the prompt(s). For instance, an image-generating prompt in the model output of the generative model that corresponds to the user query can include the user query and/or identify an address of a particular generative model trained to generate images. Based on the address of the particular generative model (e.g., an image generator, or sometimes an audio generator, etc.), the particular generative model can be utilized for processing of the user query, to provide the media content responsive to the user query.

In some implementations, optionally, the generative response can be a multi-modal response including textual content that is in addition to the media content (also referred to as non-textual content). The textual content can be generated using the generative model and be responsive to the user query. For instance, the textual content can be derived from a probability distribution (over a sequence of tokens) that is included in the model output of the generative model that corresponds to the user query. In some implementations, optionally, one or more additional selectable elements can be rendered with respect to the textual content, where the one or more additional selectable elements can be selectable GUI element(s) to receive user feedback for the textual content (or a portion thereof). However, this is not required.

In some implementations, the aforementioned one or more selectable elements can be rendered, for instance, in association with (e.g., over) the media content. In some implementations, the one or more selectable elements, once rendered at the user interface, can each be selectable and correspond to a respective type of user feedback towards the media content. For instance, assuming the media content corresponds to an image, the one or more selectable elements can include a first selectable element that corresponds to positive user feedback for the media content (e.g., the image). The first selectable element, when selected by a user of the client device, can indicate that positive user feedback for the media content is received. Additionally, or alternatively, the one or more selectable elements can include a second selectable element that corresponds to negative user feedback for the media content (e.g., the image). The second selectable element, when selected by a user of the client device, can indicate that negative user feedback for the media content is received.

In various implementations, the method further includes: causing a response to be rendered at the user interface, in response to the user query. In some implementations, causing the response responsive to the user query to be rendered at the user interface can include: causing the media content to be rendered at the user interface, in response to the user query, and causing the one or more selectable elements to be rendered at the user interface. The one or more selectable elements can be rendered at a position that is determined based on a position of the media content. For instance, the one or more selectable elements can be rendered over the media content at a bottom area of the media content, at a top area of the media content, or at any appropriate location.

In various implementations, the method further includes: receiving user input that selects one of the one or more selectable elements; determining, based on the received user input that selects the one of the one or more selectable elements, user feedback for the media content that is responsive to the user query; and training or fine-tuning the generative model based on the user query and the user feedback for the media content generated responsive to the user query.

In some implementations, the user input may select the first selectable element that corresponds to the positive user feedback for the media content. In this case, training or fine-tuning the generative model based on the user query and the user feedback that evaluates the media content with respect to the user query can include: generating a training instance to: include an input prompt that includes the user query as a training instance input, and include a tag or prompt utilized to obtain the media content as training instance output.

In some implementations, the method further includes: training or fine-tuning the generative model using the generated training instance. Training or fine-tuning the generative model using the generated training instance can include: processing the training instance input which corresponds to the input prompt that includes the user query, using the generative model, to generate a predicted model output that includes a predicted tag or predicted prompt; comparing the predicted model output with the training instance output; and training or fine-tuning the generative model based on comparing the predicted model output with the training instance output.

In some implementations, the user input selects the second selectable element that corresponds to the negative user feedback for the media content. In this case, determining the user feedback that evaluates the media content with respect to the user query can include: causing a feedback window to be rendered at the user interface. The feedback window can be rendered in response to receiving the user input that selects the second selectable element. The feedback window can include one or more selectable options each displaying a corresponding description (e.g., one or more words) that classifies the negative user feedback. Optionally, in some implementations, the feedback window further includes an input field to receive customized user feedback. In some implementations, determining the user feedback that evaluates the media content with respect to the user query can include: receiving additional user input that selects one of the one or more selectable options; and determining a classification of the negative user feedback based on the additional user input.

In some implementations, training or fine-tuning the generative model based on the user query and the user feedback that evaluates the media content with respect to the user query can include: in response to determining that the classification of the negative user feedback is a first classification, reinforcing the generative model to not output a tag utilized to obtain the media content in response to the user query. In some implementations, the first classification of the negative user feedback for the media content indicates that the media content is unnecessary or not a satisfactory quality.

Additionally or alternatively, training or fine-tuning the generative model based on the user query and the user feedback that evaluates the media content with respect to the user query can include, in response to determining that the classification of the negative user feedback is a second classification different from the first classification, updating a prompt utilized to generate the media content to generate an updated prompt, and reinforcing the generative model to output the updated prompt in response to the user query. The updated prompt can include an updated instruction to generate media content and/or an updated image generator (or other types of media content generators). In some implementations, the second classification of the negative user feedback for the media content indicates that the media content is unrelated to the user query.

In some implementations, the media content in the response is non-generative media content that is obtained based on a tag generated using the generative model. As described above, the media content (e.g., the non-generative media content) can be acquired by: generating, based on the tag, a query for the media content; and obtaining, based on submitting the query for the media content to a media content search system, the media content. For instance, the model output of the generative model that corresponds to the user query may include media content tags for non-generative media content. In these instances, based on the media content tags, non-generative media content queries can be determined and be submitted over a search system (e.g., an image search system, a video search system, an audio search system, or the like) to obtain the non-generative media content. While the media content tags are included in the model output of the generative model and are utilized in obtaining the multimedia content, the media content tags themselves may never be rendered or perceivable to the user that provided the user query.

In some implementations, the media content is generative media content that is obtained based on a generative prompt (maybe referred to elsewhere as “prompt”, “image-generating prompt” or “media content-generating prompt”, etc.) in the model output of the generative model. The media content can be acquired by: submitting, to an additional generative model (e.g., an image generator, a video generator, etc.) that is in addition to the generative model, the prompt; and obtaining, based on submitting the prompt to the additional generative model, the media content.

The preceding is presented as an overview of only some implementations disclosed herein. These and other implementations are disclosed in additional detail herein. For example, additional and/or alternative implementations are disclosed herein such as determining a favorability rate for media content generated for a plurality of user queries. The favorability rate can be determined based on a ratio of positive feedback to negative feedback, where the positive and negative feedback are received for images generated using the generative model in response to the plurality of user queries. The favorability rate can be utilized to evaluate the generative model. As another example, given all images generated using the generative model for the plurality of user query, a total number of unnecessary images can be determined based on counting the number of times that a selectable option that corresponds to the “unnecessary” classification of negative feedback is selected for each of the all images.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

By using the techniques described herein, various technical advantages can be achieved. As one non-limiting example, by rendering one or more feedback-receiving selectable elements (e.g., thumb-up and/or thumb-down buttons, happy face and/or sad face emojis, etc.) with respect to a specific portion of a response, user feedback that is directed to the specific part can be received, instead of (or in addition to) user feedback that is directed to the response in its entirety. This reduces or eliminates the need to manually review each specific portion of responses to determine a cause for negative (or positive) feedback. As the user feedback data can be of a high volume, the reduction in the need of manual review can save cost and time associated with the manual review and avoids the generation of noisy feedback data generated during manual review. As another example, by rendering a plurality of selectable options that each corresponds to a category or classification of negative feedback, training data can be collected, and an LLM used to provide media content in response to user queries can be reinforced correspondingly, to improve the quality of the provided media content.

BRIEF DESCRIPTION OF THE DRAWINGS

FIG. 3 depicts a flowchart illustrating an example method of training or fine-tuning a generative model based on a user query and user feedback that evaluates a portion of a response generated in response to the user query, in accordance with various implementations.

DETAILED DESCRIPTION OF THE DRAWINGS

The following description with reference to the accompanying drawings is provided for understanding of various implementations of the present disclosure. It's appreciated that different features from different embodiments may be combined with and/or exchanged for one another. In addition, those of ordinary skill in the art will recognize that various changes and modifications of the various embodiments described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

Figure 1A:
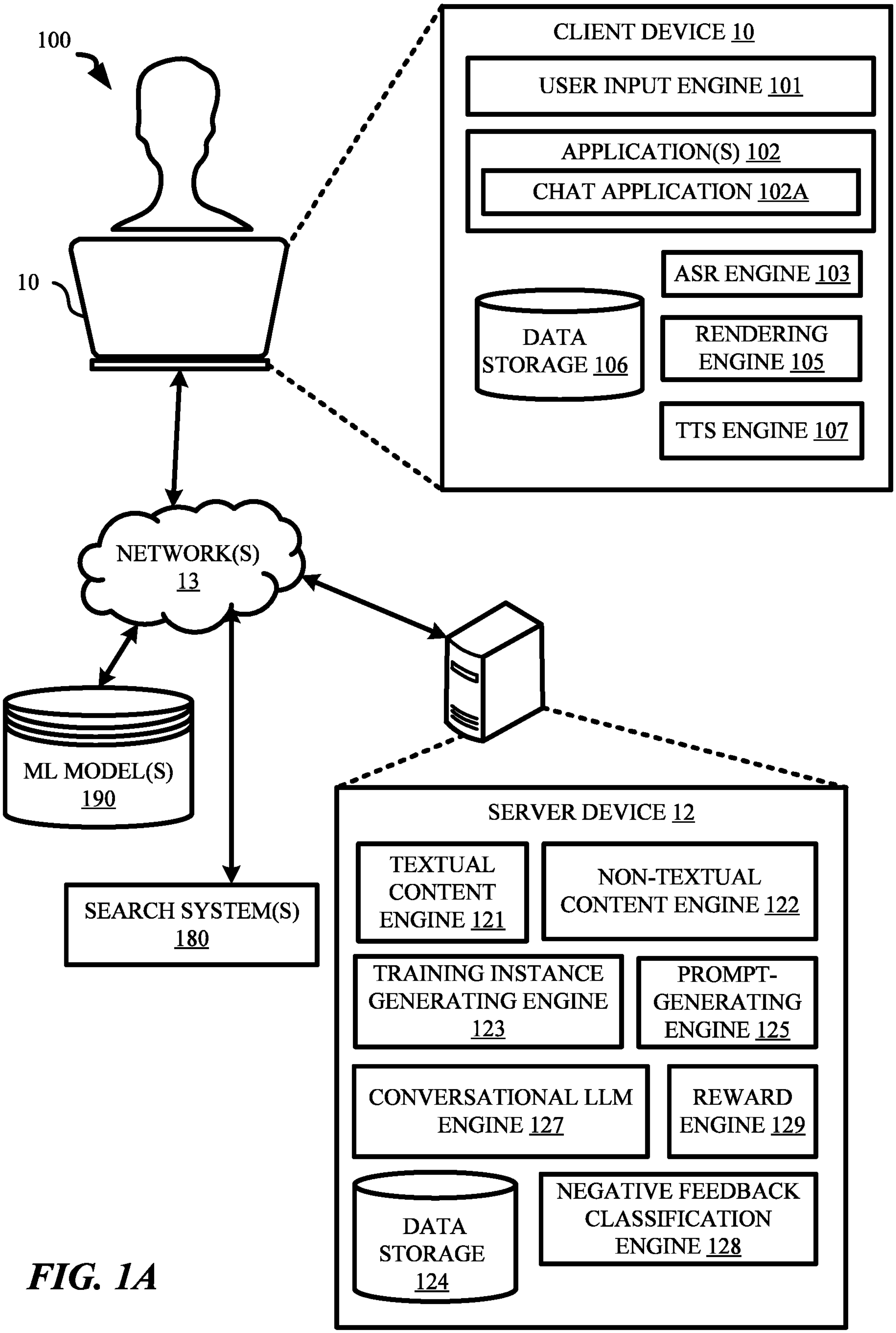
FIG. 1A depicts a block diagram of an example environment that demonstrates various aspects of the present disclosure, and in which some implementations disclosed herein can be implemented.

FIG. 1A is a block diagram of an example environment 100 that demonstrates various aspects of the present disclosure, and in which implementations disclosed herein may be implemented. As shown in FIG. 1A, the environment 100 can include a client computing device 10 ("client device"), and a server computing device 12 ("server device") in communication with the client computing device 10. The client computing device 10 can be, for example, a desktop computing device, a laptop computing device, a tablet computing device, a mobile phone computing device, a computing device of a vehicle (e.g., an in-vehicle entertainment or navigation system), an interactive speaker, a smart appliance such as a smart television, and/or a wearable apparatus that includes a computing device (e.g., glasses having a computing device, a smart watch, a virtual or augmented reality computing device), and the present disclosure is not limited thereto. The server computing device 12 can communicate with the client computing device 10 via one or more networks 13.

The one or more networks 13 can include, for example, a local area network (LAN), a wide area network (WAN) such as the Internet, and/or any other appropriate network. In some implementations, the client computing device 10 can include, or other access one or more machine learning (ML) models 190 via the one or more networks 13. Additionally, or alternatively, the server computing device 12 in communication can include, or other access the one or more machine learning (ML) models 190 via the one or more networks 13. Additionally, or alternatively, the client computing device 10 or the server computing device 12 can access one or more search systems 180. The one or more search systems 180 can each include, for instance, a media content database.

For instance, the one or more search systems 180 can include a first search system that can search an image database for non-generative images (e.g., images retrieved or selected from one or more data sources such as public forum, website, etc.). Additionally, or alternatively, the one or more search systems 180 can include a second search system that can search a video database for non-generative videos (e.g., videos published in websites, shared/authorized by users, etc.). Additionally, or alternatively, the one or more search systems 180 can include a third search system that can search an audio database for non-generative audios. Descriptions of the search system(s) 180 are not limited herein.

Figure 1B:
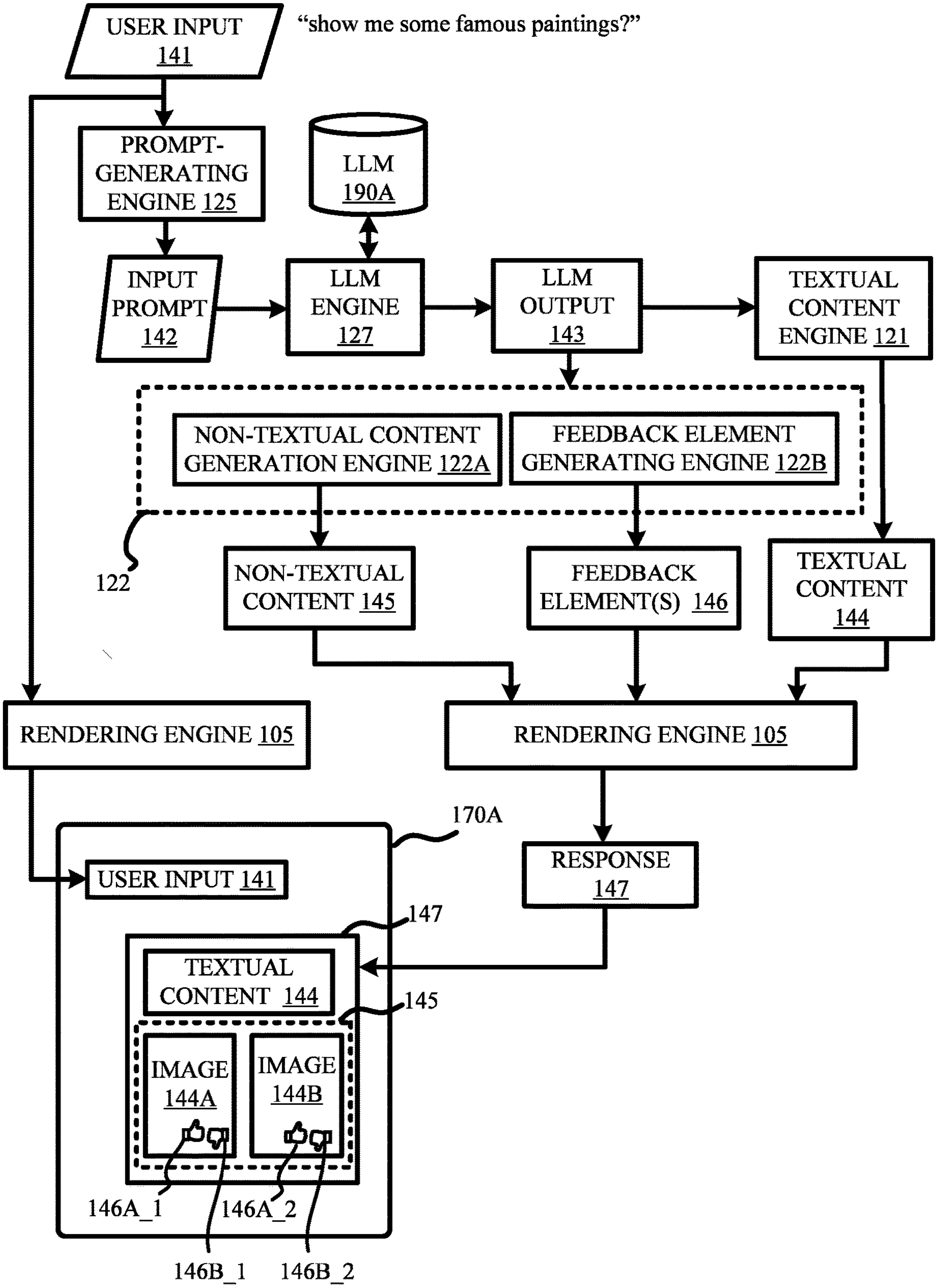
FIG. 1B depicts an example process flow of providing feedback elements to receive user feedback directed to a specific portion of a response that demonstrates various aspects of the present disclosure, and in which some implementations disclosed herein can be implemented.
Figure 1C:
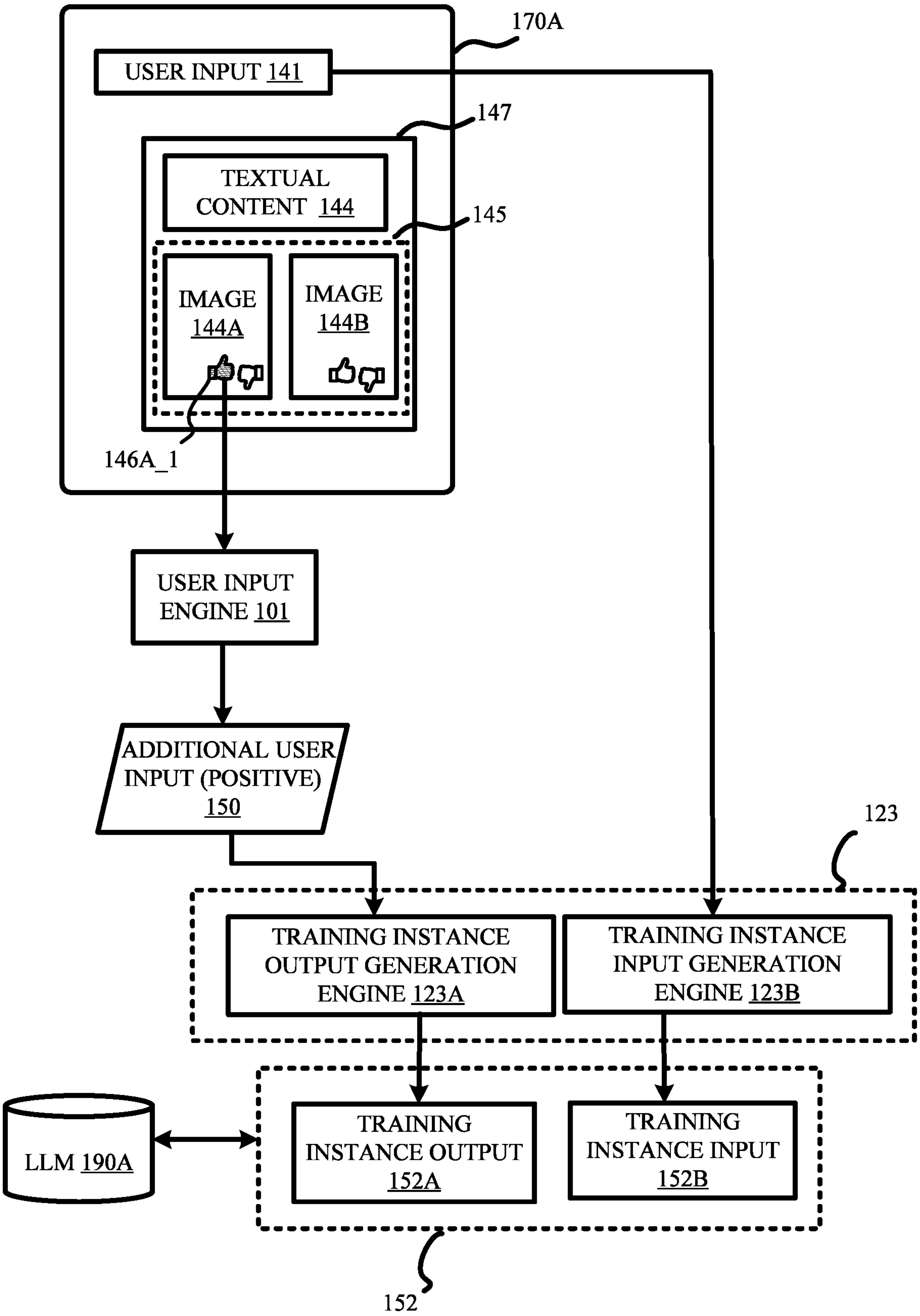
FIG. 1C depicts an example process flow of generating a training instance in response to receiving positive user feedback for a specific portion of a response, which demonstrates various aspects of the present disclosure, and in which some implementations disclosed herein can be implemented.
Figure 1D:
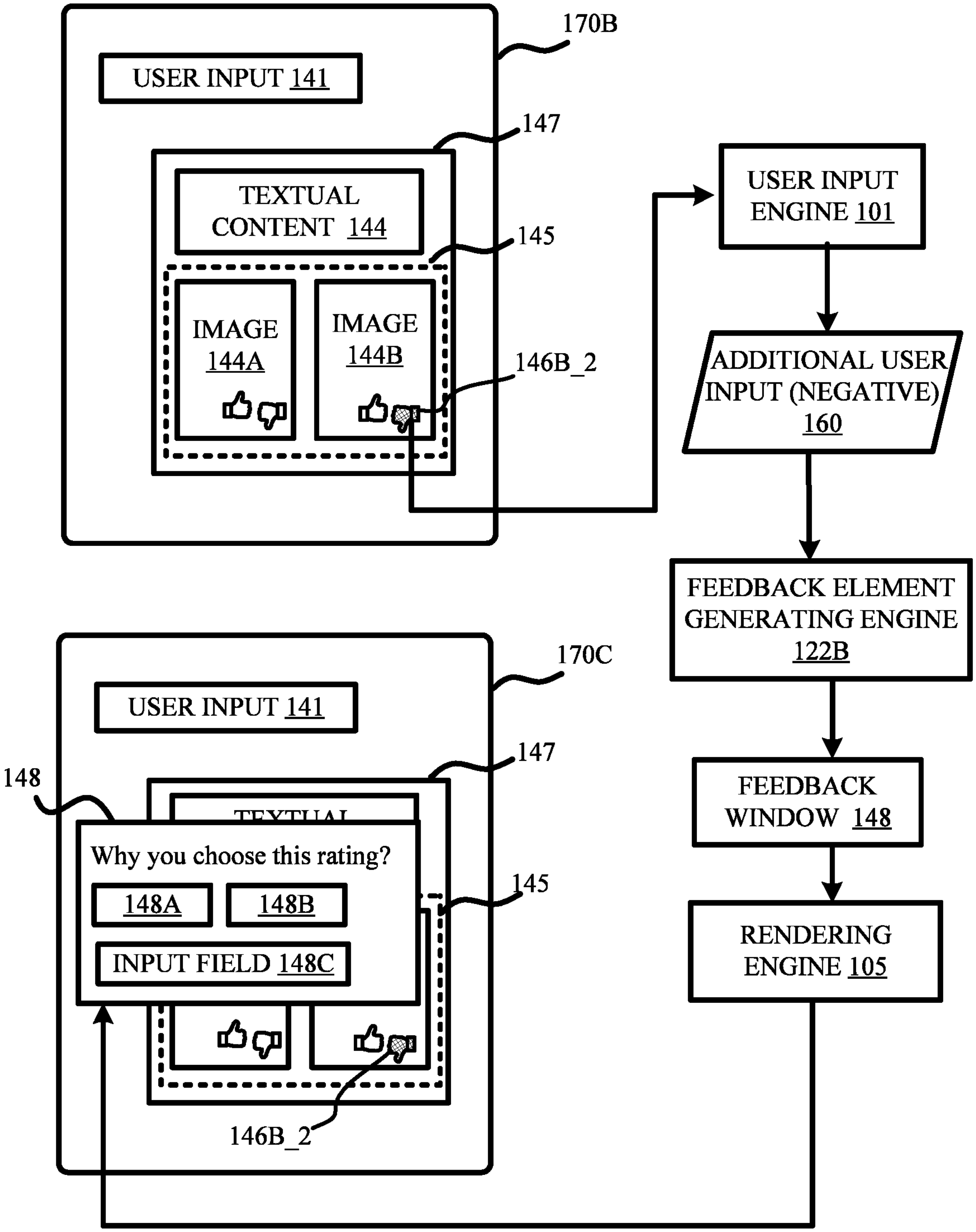
FIG. 1D depicts an example process flow of providing a feedback window to receive detailed negative feedback for a specific portion of a response, which demonstrates various aspects of the present disclosure, and in which some implementations disclosed herein can be implemented.
Figure 1E:
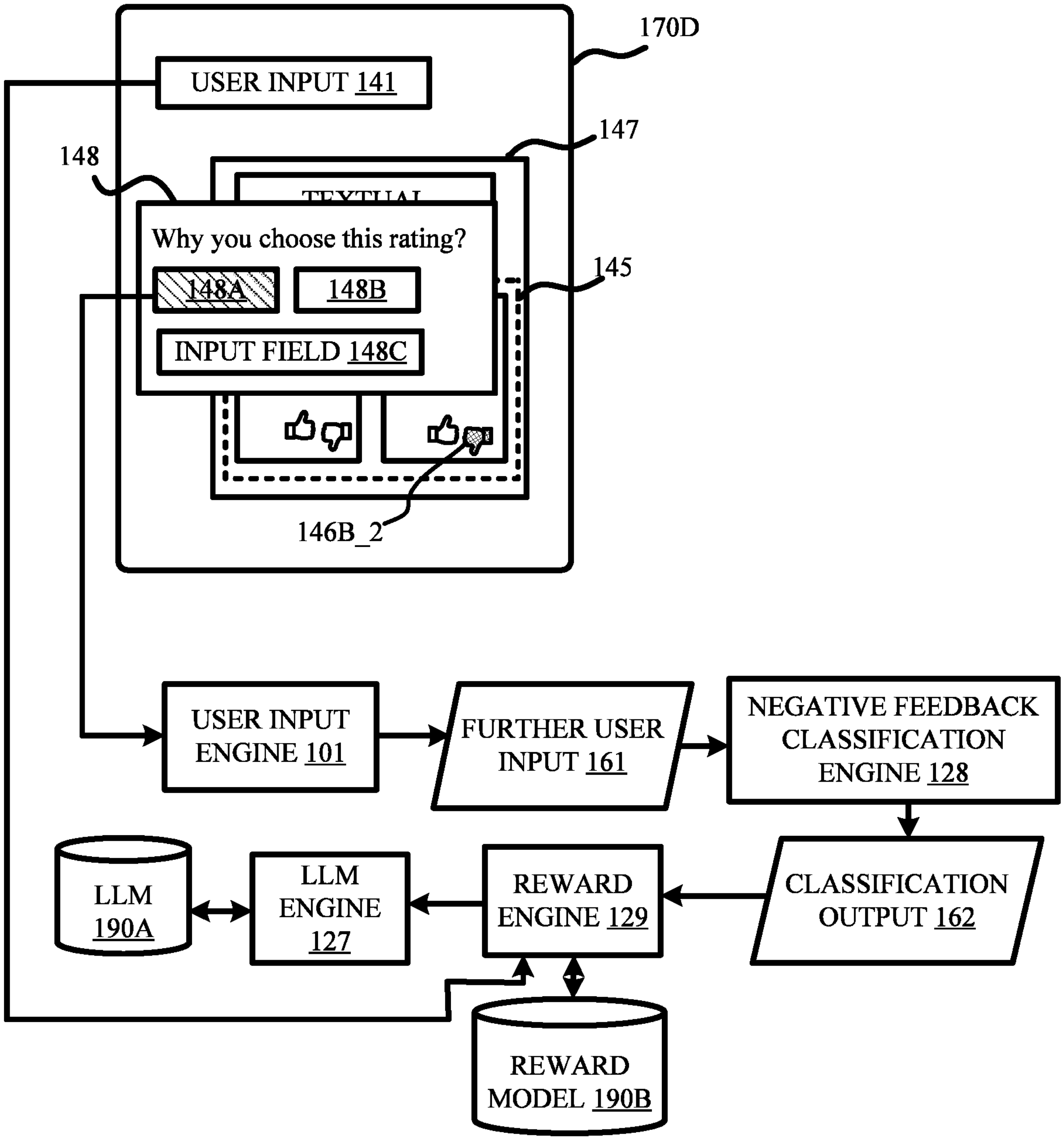
FIG. 1E depicts an example process flow of utilizing detailed negative feedback received from a user for a specific portion of a response to perform reinforced learning, which demonstrates various aspects of the present disclosure, and in which some implementations disclosed herein can be implemented.

The one or more ML models 190 can include, for instance, a generative model (e.g., LLM 190A in FIG. 1B), a reward model 190B in FIG. 1E, and/or one or more additional generative models. The one or more additional generative models can be in addition to the generative model (e.g., LLM 190A in FIG. 1B) and can be in communication with the generative model. For instance, the one or more additional generative models can include an image-generating model ("image generator") trained to generate images using an image-generating prompt, a video-generating model trained to generate videos using a video-generating prompt, an audio-generating model ("audio generator") trained to generate audio(s) using an audio-generating prompt, and/or other generative model(s).

In some implementations, model output of the LLM 190A can indicate an address or location of the image generator, where a user query (or a prompt derived therefrom) can be processed using the image generator to generate images requested by the user query. In some implementations, model output of the LLM 190A can indicate an address or location of the video generator, where a user query (or a prompt derived therefrom) can be processed using the video generator to generate videos requested by the user query. In some implementations, model output of the LLM 190A can indicate an address or location of the audio generator, where the user query (or a prompt derived therefrom) can be processed using the audio generator to generate audios requested by the user query.

In some implementations, model output of the LLM 190A can indicate an address or location of the video generator as well as an address or location of the image generator. In this case, a user query (or a prompt derived therefrom) can be processed using the video generator to generate videos responsive to the user query, and the user query (or a prompt derived therefrom) can be processed using the image generator to generate images responsive to the user query.

In various implementations, the client computing device 10 can include software component(s) such as a user input engine 101 and/or hardware component(s) such as input and output (I/O) device(s). The I/O device(s) can include, for instance, one or more speakers and one or more microphones. In some implementations, the I/O device(s) can include other hardware component(s) such as a display to visually render natural language content and/or visual content, and/or a keyboard (not depicted) to receive typed input, touch input, or other types of input.

The user input engine 101 can be configured to detect user input provided by a user of the client computing device 10 using one or more of the input devices. For example, the user input engine 101 can detect/receive typed input provided by a user using the aforementioned keyboard. As another example, the client computing device 10 can be equipped with one or more touch sensitive components (e.g., a touch screen, a touch panel, etc.) that are configured to receive a user selection that selects one or more graphical user interface (GUI) elements that is rendered visually at a user interface of the client computing device 10. Additionally, or alternatively, the client computing device 10 can be equipped with a mouse (or one or more hardware buttons) to receive a user click that selects one or more graphical user interface (GUI) elements that is rendered visually at a user interface of the client computing device 10. Additionally, or alternatively, the one or more microphones can capture audio data, such as audio data corresponding to spoken utterances of the user or other sounds in an environment of the client computing device 10. Additionally, or alternatively, the client computing device 10 can be equipped with one or more vision components (e.g., a camera) that are configured to capture vision data corresponding to images and/or movements (e.g., gestures, etc.) detected in a field of view of one or more of the vision components.

In various implementations, the client computing device 10 can further include one or more applications 102. The one or more applications 102 can include, for instance, a chat application 102A. In some implementations, the chat application 102A can include or otherwise access, for instance, an automatic speech recognition (ASR) engine 103. The ASR engine 103 can process audio data that captures a spoken utterance to generate a speech recognition of the spoken utterance. In some implementations, the audio data that captures the spoken utterance can be determined as being directed to the chat application 102A. For instance, the audio data that captures the spoken utterance can be determined as being directed to the chat application 102A based on the audio data that captures the spoken utterance being received while the chat application 102A is running at the client computing device 10. In this case, the speech recognition of the spoken utterance can be rendered visually (e.g., using a rendering engine 105) via a chat interface of the chat application 102A.

In some implementations, optionally, the chat application 102A can include, or otherwise access, a textual content engine 121, a non-textual content engine 122, a prompt-generating engine 125, and/or a conversational LLM engine 127. These engines can be implemented at the client computing device 10, at the server computing device 12, or shared therebetween. The prompt-generating engine 125 can be configured to generate an input prompt in response to receiving a user query such as "show me some cute cat pictures". In some implementations, the input prompt can be generated based on the user query. For instance, the input prompt can be "generate images showing cute cat", and optionally include additional details for the input prompt that are determined by the prompt-generating engine 125. The generated input prompt can be processed by the conversational LLM engine 127 using a generative model (e.g., LLM 190A in FIG. 1B), to generate a generative model output from which a response (responsive to the user query) is derived.

In some implementations, the generative model output can include a probability distribution over a sequence of tokens (e.g., words, phrases, or other semantic units) that are predicted to be responsive to the user query (e.g., "show me some cute cat pictures"). Additionally, or alternatively, the generative model output can include one or more non-generative media content tags for use in obtaining non-generative media content that is predicted to be responsive to the user query. Additionally, or alternatively, the generative model output can include generative media content prompts for use in obtaining generative media content that is predicted to be responsive to the user query. In some implementations, the textual content engine 121 can generate a textual portion based on processing the probability distribution over the sequence of tokens (e.g., over the words, phrases, or other semantic units). The generated textual portion can be included in the response that is to be rendered responsively to the user query. For instance, the generated textual portion can be "Here are some cute cat pictures for you" in response to the user query of "show me some cute cat pictures".

The non-textual content engine 122 can include a non-textual content generation engine 122A (see, e.g., in FIG. 1B), to generate a non-textual portion (e.g., media content) based on processing the aforementioned non-generative media content tags, and/or the generative media content prompts. For instance, the non-textual content engine 122 can include a tag determination engine (not depicted) to parse the generative model output and determine that the generative model output includes a non-generative media content tag of "cute cat". In this case, the non-textual content engine 122 can utilize such "cute cat" tag to search a media content search system (which can include a media content database), from the search system(s) 180, for images showing "cute cat".

Alternatively, or additionally, the tag determination engine of the non-textual content engine 122 can parse the generative model output and determine that the generative model output includes a generative media content prompt. The generative media content prompt can be, for instance, "{prompt: [generate image of cute cat] image generator {url: . . . }}" which include an address (e.g., URL) of an image generator and an input prompt of "generate image of cute cat". In this example, the input prompt of "generate image of cute cat" in the generative media content prompt can be determined based on the user query of "show me some cute cat pictures". The input prompt of "generate image of cute cat" can be processed using the image generator, to generate image(s) responsive to the user query.

In other words, the non-textual content engine 122 can submit the generative media content prompt to an additional generative model (e.g., the image generator) that is in addition to the generative model, to acquire media content (e.g., images of "cute cat") generated using the additional generative model. For instance, the input prompt (that is included in the generative media content prompt and that is to be processed using the additional generative model) can be processed using the additional generative model, to generate the media content responsive to the user query (e.g., "show me some cute cat pictures").

The non-textual portion (e.g., media content such as audio, image(s), video(s)) obtained and/or generated using the non-textual content engine 122 and the textual portion generated using the textual content engine 121 can be combined and rendered in response to the user query. For instance, the rendering engine 105 can cause the generated textual portion of "Here are some cute cat pictures for you" and the one or more images of cute cats, to be rendered as a response responsive the user query of "show me some cute cat pictures". It is noted that, based on the type of media content requested by the user query, the generative media content prompt can be submitted to other generative models such as a video generator, an audio generator, or other types of generator(s) to acquire content (e.g., video, audio, etc.) requested by the user query. The present disclosure is not limited to the examples provided herein.

In various implementations, the non-textual content engine 122 can further include a feedback element generating engine 122B (see in FIG. 1B) to generate one or more feedback elements (and/or feedback windows) for the non-textual portion (and sometimes for the textual portion as well) generated using the non-textual content generation engine 122A. For instance, the non-textual portion can include a first image retrieved using a non-generative media content tag (e.g., "cute cat") or generated using a generative media content prompt (e.g., "{prompt: [image of cute cat] image generator {url: . . . }}"). In this case, the feedback element generating engine 122B can generate a first set of feedback elements for the first image, and the rendering engine 105 can render the first set of feedback elements with respect to the first image. The first set of feedback elements can include, for instance, a first selectable element that corresponds to a positive user feedback. The first selectable element, when selected, indicates that positive user feedback is received for the first image. Additionally, or alternatively, the first set of feedback elements can include, for instance, a second selectable element that corresponds to a negative user feedback. The second selectable element, when selected, indicates that negative user feedback is received for the first image.

In some implementations, optionally, in response to receiving user selection of the first selectable element (that corresponds to positive user feedback) for the first image, the training instance generating engine 123 can generate a training instance. The training instance generating engine 123 can generate a training instance input, for the training instance, based on the user query, and generate a training instance output, for the training instance, that includes a tag or prompt (e.g., the generative media content prompt) utilized to acquire the first image. The generated training instance can be applied to train or fine-tune the generative model (e.g., LLM 190A).

In some implementations, optionally, in response to receiving user selection of the second selectable element (that corresponds to negative user feedback) for the first image, the feedback element generating engine 122B can generate a feedback window (or retrieve a pre-defined feedback window). The rendering engine 105 can cause the feedback window to be rendered with respect to the first image. Optionally, the rendering engine 105 can cause the feedback window to be rendered with respect to the second selectable element rendered over the response responsive to the user query. The feedback window, for instance, can include a plurality of selectable options which when selected, each corresponds to a specific category of negative user feedback. The plurality of selectable options, for instance, can include a first selectable option corresponding to "unrelated", a second selectable option corresponding to "unnecessary", a third selectable option corresponding to "offensive", a fourth selectable option corresponding to "blurred", etc. Additionally, or alternatively, the feedback window can include an input field to receive customized user feedback and/or other types of comment for the first image.

Optionally, in response to receiving user selection of a particular selectable option rendered within the feedback window that corresponds to negative user feedback for the first image, data can be collected to update a policy of the LLM 190A via reinforced learning. For instance, in response to the user selecting the first selectable option corresponding to "unnecessary", the LLM 190A can be reinforced to not generate the non-generative media content tag using which the first image is retrieved. As another example, in response to the user selecting the second selectable option corresponding to "unrelated", the LLM 190A can be reinforced to generate LLM output having a rewritten generative media content prompt. The rewritten generative media content prompt can access an updated image generator or an additional image generator provided by another supplier different than a supplier of the aforementioned image generator (using which the first image is generated).

It is noted that while the non-textual portion is illustrated above to include the first image, the non-textual portion can include a second image or other types of media content such as a video, an audio piece, etc. As described above, the second image can be retrieved using a non-generative media content tag (e.g., an image tag) or can be generated using a generative media content prompt (processable using an image generator). The video can be retrieved using a non-generative audio tag or can be generated using a generative media content prompt (processable using an audio generator).

In case the non-textual portion includes the second image, the feedback element generating engine 122B can generate a second set of feedback elements for the second image, and the rendering engine 105 can render the second set of feedback elements with respect to the second image. The second set of feedback elements can include, for instance, a third selectable element that corresponds to positive user feedback, where the third selectable element when selected, indicates that positive user feedback is received for the second image. Additionally, or alternatively, the second set of feedback elements can include, for instance, a fourth selectable element that corresponds to negative user feedback. The fourth selectable element when selected, indicates that negative user feedback is received for the second image.

In some implementations, the LLM 190A (or other generative models), for instance, can include at least hundreds of millions of parameters. The LLM 190A can alternatively include at least billions of parameters, such as one hundred billion or more parameters. In some implementations, the LLM 190A is a sequence-to-sequence model, is Transformer-based, and/or can include an encoder and/or a decoder. One non-limiting example of an LLM is GOOGLE'S Pathways Language Model (PaLM). Another non-limiting example of an LLM is GOOGLE'S Language Model for Dialogue Applications (LaMDA).

By providing a user feedback mechanism that enables a user to provide feedback towards one or more specific portions of a response generated using an LLM, training instances and/or other training data can be collected to train or fine-tune the LLM in generating improved responsive content (textual, media, or multimedia) responsive to user queries. The improved responsive content can reduce the chance of receiving multiple user attempts in acquiring satisfactory media content, thus reducing the duration of user-to-computer interaction between a user and a computing system that implements the LLM. As a result, computational resources, memory resources, battery resources, and computational costs associated with a user using the LLM to acquire desired content can be reduced.

In some implementations, the chat application 102A can include, but does not necessarily need to include, a NLU engine (not depicted) to determine semantic meaning(s) of a text (e.g., the aforementioned typed input or speech recognition of the user utterance) and/or the audio (e.g., the aforementioned audio data capturing the spoken utterance). The NLU engine can decompose the determined semantic meaning(s) to determine intent(s) and/or parameter(s) for an action (e.g., generating a response) performable via the chat application 102A. For instance, the NLU engine can process natural language content of "weather today?", to determine a natural language understanding (NLU) intent of "search" and/or parameters (e.g., "weather" and "today") for an action of searching the Internet for weather today.

In some implementations, the NLU engine can resolve the intent(s) and/or parameter(s) based on a single utterance of a user, and, in other situations, prompts can be generated based on unresolved intent(s) and/or parameter(s). In this latter situation, the generated prompts can be rendered (e.g., visually and/or audibly) to the user to receive user response (s), where the user response(s) to the rendered prompt(s) can be utilized by the NLU engine in resolving intent(s) and/or parameter(s). Optionally, the NLU engine can work in concert with a dialog manager engine (not illustrated) that determines unresolved intent(s) and/or parameter(s). For instance, the dialog manager engine can be alternatively or additionally utilized to generate the aforementioned prompt (s). In some implementations, the NLU engine can utilize one or more NLU machine learning models in determining intent(s) and/or parameter(s).

In some implementations, the chat application 102A can, but does not necessarily need to, a text-to-speech (TTS) engine 107. The TTS engine 107 can convert a text to a synthesized speech (e.g., using a particular voice), for instance, when the text includes responsive content generated in response to a spoken utterance from a user. The synthesized speech, for instance, can be generated by using one or more trained speech synthesis neural network models to process the text. The synthesized speech can be audibly rendered via hardware speaker(s) of the client computing device 10 (e.g., a stand-alone speaker) or via another device (e.g., a cell phone).

In some implementations, the client computing device 10 can include a data storage 106. The data storage 106 can store various types of files and/or data. For instance, the data storage 106 can store application data of the chat application 102A (and/or one or more additional applications), user data (e.g., one or more user profiles) of a user of the client computing device 10, and/or other metadata. The one or more additional applications can include, for example, a social media application, a video player, a note-taking application, a shopping application, a messaging application, and/or any other appropriate applications (or services), installed at (or accessible via) the client computing device 10.

The server computing device 12 can be, for example, a web server, one or more blade servers acting together to provide "cloud" infrastructure, or any other type of server as needed. In various implementations, the server computing device 12 can include cloud-based components the same as or similar to hardware and/or software components of the client computing device 1. The same or similar descriptions are omitted herein for the sake of brevity. In some implementations, the server computing device 12 (and/or the client computing device 10) can include a data storage that stores training instance(s) or other training data to train the LLM 190A.

FIG. 1B depicts a non-limiting example process flow of providing feedback elements to receive user feedback directed to a specific portion of a response that demonstrates various aspects of the present disclosure, and in which some implementations disclosed herein can be implemented. As shown in FIG. 1B, a user input 141 can be received and provided to the prompt-generating engine 125 to generate an input prompt 142. As a non-limiting example, the user input 141 can be a typed input such as "show me some famous paintings", where the typed input is received via an input component/device (e.g., keyboard) of a user device (e.g., the client device 10). Alternatively, the user input 141 can be transcribed from an audio input such as a spoken utterance of "show me some famous paintings". Descriptions of the user input 141, however, are not limited herein.

Continuing with the non-limiting example, the prompt-generating engine 125 can generate the input prompt 142 to include the user input 141 and an instruction to generate responsive content. The input prompt 142, for instance, can be: "'show me some famous paintings', generate a response for the above user input". In this case, the input prompt 142 can be processed by the LLM engine 127 using a generative model such as LLM 190A, to generate an LLM output 143. The LLM 190A can include millions or billions of weights and/or parameters that are learned through training the LLM 190A on enormous amounts of diverse data. This enables the LLM 190A to generate the LLM output 143 to include a probability distribution over a sequence of tokens. Based on processing the probability distribution over the sequence of tokens, the textual content engine 121 can generate/determine a textual portion (e.g., text content 144) responsive to the user input. For instance, given the user input 141 of "show me some famous paintings", the textual portion generated by the textual content engine 121 may be: "here are some famous paintings", or "listed below are some famous paintings", etc.

Further, the LLM 190A can be fine-tuned so that the LLM output 143 can include one or more non-generative media content tags (sometimes referred to shortly as "tag(s)") and/or one or more generative media content prompts (sometimes referred to shortly as "prompt(s)"). In some implementations, the non-textual content generation engine 122A can parse the one or more non-generative media content tags and/or the generative media content tags, from the LLM output 143. In some implementations, the non-textual content generation engine 122A can utilize the one or more non-generative media content tags to search a media content search system for non-generative media content (e.g., image, video, and/or audio, etc. that is stored in the one or more media content databases) that is responsive to the user input 141.

For instance, given the user input 141 of "show me some famous paintings", the LLM output 143 can include one or more non-generative media content tags. The one or more non-generative media content tags in such LLM output can include a first image tag of "famous painting" and/or a second image tag of "famous paintings". In this case, the non-textual content generation engine 122A can search an image database using the first image tag of "famous painting" as a first search term, to acquire a first search result identifying one or more images that are responsive to the first search term. The non-textual content generation engine 122A can further search the image database using the second image tag of "famous paintings" as a second search term, to acquire a second search result identifying one or more additional images that are responsive to the second search term. In this case, the non-textual content generation engine 122A can generate a non-textual portion (e.g., non-text content 145, "media content") responsive to the user input 141, where the non-textual portion responsive to the user input 141 includes the one or more images from the first search result and the one or more additional images from the second search result.

Additionally, or alternatively, in some implementations, the non-textual content generation engine 122A can utilize the one or more generative media content prompts to identify one or more additional generative models (that is in addition to the LLM 190A). Each input prompt (the same as or different from input prompt 142) included in the one or more generative media content prompts can be processed using a corresponding one of the additional generative models, to generate a corresponding model output from which generative media content (e.g., LLM-generated image, LLM-generated video, LLM-generated audio) responsive to the user input 141 is derived.

For instance, if the user input 141 is "show me some cute cat pictures", the LLM output 143 can include one or more generative media content prompts (instead of or in addition to one or more non-generative media content tags). The one or more generative media content prompts in such LLM output can include a first generative media content prompt of {first prompt: [image of cute cat] image generator 1 {url: . . . }}" and a second generative media content prompt of {second prompt: [image of cute cat] image generator 2 {url: . . . }}". In this case, the non-textual content generation engine 122A can cause the first prompt to be processed, using the image generator 1, for one or more iterations, which results in one or more model output from which one or more synthesized images (e.g., showing a cute cat) can be derived. The non-textual content generation engine 122A can cause the second prompt to be processed, using the image generator 2, for one or more iterations, which results in one or more additional model output from which one or more additional synthesized images (e.g., showing a cute cat) can be derived. The non-textual content generation engine 122A can generate the non-textual portion (e.g., the non-textual content 145) by including the one or more synthesized images and the one or more additional synthesized images in the non-textual content 145.

In various implementations, the non-textual content engine 122 can include a feedback element generating engine 122B that is in addition to the non-textual content generation engine 122A. The feedback element generating engine 122B can be in communication with the non-textual content generation engine 122A. For instance, referring to FIG. 1B, in response to determining that the non-textual content generation engine 122A generates the non-textual content 145 (which can include a first image 144A and a second image 144B), the feedback element generating engine 122B can generate feedback element(s) 146 for the non-textual content 145. The feedback element(s) 146 can include, for instance, a first set of selectable elements for the first image 144A and/or a second set of selectable elements for the second image 144B.

The first set of selectable elements for the first image 144A can include a first selectable element 146A_1 and a second selectable element 146B_1. The first selectable element 146A_1 can be, for instance, a selectable graphical user interface (GUI) element represented by a thumb-up icon. The first selectable element 146A_1, when selected by a user (e.g., by clicking the thumb-up icon), can indicate that positive user feedback is received for the first image 144A. The second selectable element 146B_1 can be, for instance, a selectable GUI element represented by a thumb-down icon. The second selectable element 146B_1, when selected by a user (e.g., by clicking the thumb-down icon), can indicate that negative user feedback is received for the first image 144A.

The second set of selectable elements for the second image 144B can include a third selectable element 146A_2 and a fourth selectable element 146B_2. The third selectable element 146A_2 can be, for instance, a selectable GUI element represented by a thumb-up icon (or a happy face icon). The third selectable element 146B_2, when selected by a user (e.g., that clicks the thumb-up icon), can indicate that positive user feedback is received for the second image 144B. The fourth selectable element 146B_2 can be, for instance, a selectable GUI element represented by a thumb-down icon (or a sad face icon). The fourth selectable element 146B_2, when selected by a user (e.g., by clicking the thumb-down icon), can indicate that negative user feedback is received for the second image 144B.

Referring again to FIG. 1B, the rendering engine 105 can cause the textual content 144, the non-textual content 145, and/or the feedback element(s) 146 to be rendered as a response 147 responsive to the user input 141, at a user interface 170A of a user device. The response 147 can be rendered at the user interface 170A with respect to the user input 141. In some implementations, the rendering engine 105 can cause the feedback element(s) 146 to be rendered with respect to the non-textual content 145. For instance, as illustrated in FIG. 1B, the rendering engine 105 can cause the first set of selectable elements (146A_1 and 146B_1) to be rendered over the first image 144A, and can cause the second set of selectable elements (146A_2 and 146B_2) to be rendered over the second image 144B.

It is noted that, while the response 147 responsive to the user input 141 is illustrated in FIG. 1B to include the textual content 144 and the non-textual content 145 (which includes the first image 144A and the second image 144B), content, a displaying location, and/or a displaying manner of the response 147 are not limited to illustrations in FIG. 1B. For instance, the response 147 may or may not include the textual content 144. Also, for instance, the non-textual content 145 can include one or more videos (and/or audio files) that are retrieved or generated in response to the user input 141 based on the user input 141 requesting desired video (and/or audio) content. It is noted that the total number of images, videos, or audios included in the non-textual content 145 is not limited to descriptions herein, and can be any applicable number. It is further noted that while FIG. 1B is illustrated to show feedback elements (e.g., 146A_1, etc.) being provided to one or more specific portions (e.g., the first image 144A and the second image 144B) of the non-textual content 145, similar or different feedback elements can be rendered over the textual content 144 to receive user feedback for the textual content 144 (or one or more specific portions thereof).

FIG. 1C depicts a non-limiting example process flow of generating a training instance in response to receiving positive user feedback for a specific portion of a response (e.g., response 147 in FIG. 1B) which demonstrates various aspects of the present disclosure, and in which some implementations disclosed herein can be implemented. As shown in FIG. 1C, after viewing the response 147 that is rendered at the user interface 170A in response to the user input 141, a user may provide positive feedback directing to a specific portion of the response 147. For instance, the user can provide an additional user input 150 that selects (e.g., by clicking a mouse, touch a touch screen) the first selectable element 146A_1 that corresponds to positive user feedback ("positive feedback") for the first image 144A. In this case, the user input engine 101 can detect the additional user input 150, which corresponds to selection of the first selectable element 146A_1.

Based on the detection of the additional user input 150 that selects the first selectable element 146A_1, a training instance output generation engine 123A, of the training instance generating engine 123, can generate a training instance output 152A. The training instance output 152A may include, for instance, the non-generative media content tag ("the tag") used to retrieve the first image 144A (for which positive feedback is received from the user). A training instance input generation engine 123B, of the training instance generating engine 123, can generate a training instance input 152B. The training instance input 152B can include, for instance, the user input 141. The training instance output 152A can be stored (e.g., in a training instance database) in association with the training instance input 152B, to form a training instance 152.

The training instance 152 can be applied to train or fine-tune the LLM 190A (or a different generative model). For instance, the training instance input 152B can be processed as input, using the LLM 190A or the different generative model, to generate a model output. The model output can be compared with the training instance output 152A, and parameters of the LLM 190A or the different generative model can be modified based on comparing the model output with the training instance output 152A.

FIG. 1D depicts a non-limiting example process flow of providing a feedback window to receive detailed negative feedback for a specific portion of a response (e.g., response 147 in FIG. 1B), which demonstrates various aspects of the present disclosure, and in which some implementations disclosed herein can be implemented. As shown in FIG. 1D, after viewing the response 147 that is rendered at the user interface 170A in response to the user input 141, a user may provide negative feedback directing to a specific portion of the response 147. For instance, the user can provide an additional user input 160 that selects (e.g., by clicking a mouse, touch a touch screen) the fourth selectable element 146B_2 that corresponds to negative feedback for the second image 144B. In this case, the user input engine 101 can detect the additional user input 160 that selects the fourth selectable element 146B_2.

In response to detecting the additional user input 160 that selects the fourth selectable element 146B_2 (which corresponds to negative feedback for the second image 144B), the feedback element generating engine 122B can generate a feedback window 148 (or retrieve a predetermined feedback window), and the rendering engine 105 can cause the feedback window 148 to be rendered (e.g, as an overlay) with respect to the second image 144B of the response 147. The feedback element generating engine 122B can generate the feedback window 148 to include a description of the feedback window 148, and/or one or more selectable options. The description for the feedback window 148 can be, for instance, "Why you choose this rating?". The one or more selectable options can include, for instance, a first selectable option 148A corresponding to a first category (e.g., "image unrelated" or "unrelated") of negative feedback for the second image 144B, and/or a second selectable option 148B that correspond to a second category (e.g., "image unnecessary" or "unnecessary") of the negative feedback for the second image 144B, where the second category is different from the first category. In some implementations, optionally, the feedback window 148 can include an input field 148C to receive custom description or classification of the negative user feedback for the second image 144B.

FIG. 1E depicts a non-limiting example process flow of utilizing detailed negative feedback received from a user for a specific portion of a response to perform reinforced learning, which demonstrates various aspects of the present disclosure, and in which some implementations disclosed herein can be implemented. As shown in FIG. 1E, after viewing the feedback window 148 that is rendered at the user interface 170A, a user may provide detailed negative feedback. For instance, the user can provide a further user input 161 that selects (e.g., by clicking a mouse, touch a touch screen) the first selectable option 148A (or the second selectable option 148B, or other option) that corresponds to the first category of negative feedback for the second image 144B. In this case, the user input engine 101 can detect the further user input 161 that selects the first selectable option 148A.

In response to detecting the further user input 161 that selects the first selectable option 148A, a negative feedback classification engine 128 can classify the negative feedback for the second image 144B, to generate a classification output 162 that indicates the classification for the negative feedback received for the second image 144B. Training data can be generated based on the classification output 162 that indicates the classification for the negative feedback received for the second image 144B and the user input 141. For instance, when the classification output 162 that indicates the classification for the negative feedback received for the second image 144B corresponds to a first classification (e.g., unnecessary or image unnecessary), the training data can be applied to train a reward engine 129 (which is in communication with a reward model 190B and the LLM engine 127). The trained reward model 190B can be utilized to fine tune the LLM 190A via reinforced learning. For instance, the LLM 190A can be reinforced to not output a tag or prompt utilized to acquire the second image 144B in response to receiving the user input 141. For instance, when the classification output 162 that indicates the classification for the negative feedback received for the second image 144B corresponds to a second classification (e.g., unrelated or image unrelated), the generative media content prompts in the LLM output of the LLM 190A that corresponds to the user input 141 can be re-written or modified, or the image generator (or other generative models) identified in the generative media content prompts can be updated or replaced. The LLM 190A can be fine-tuned to generate output that includes the re-written generative media content prompts and/or the updated image generator (or other generative models).

Figure 2A:
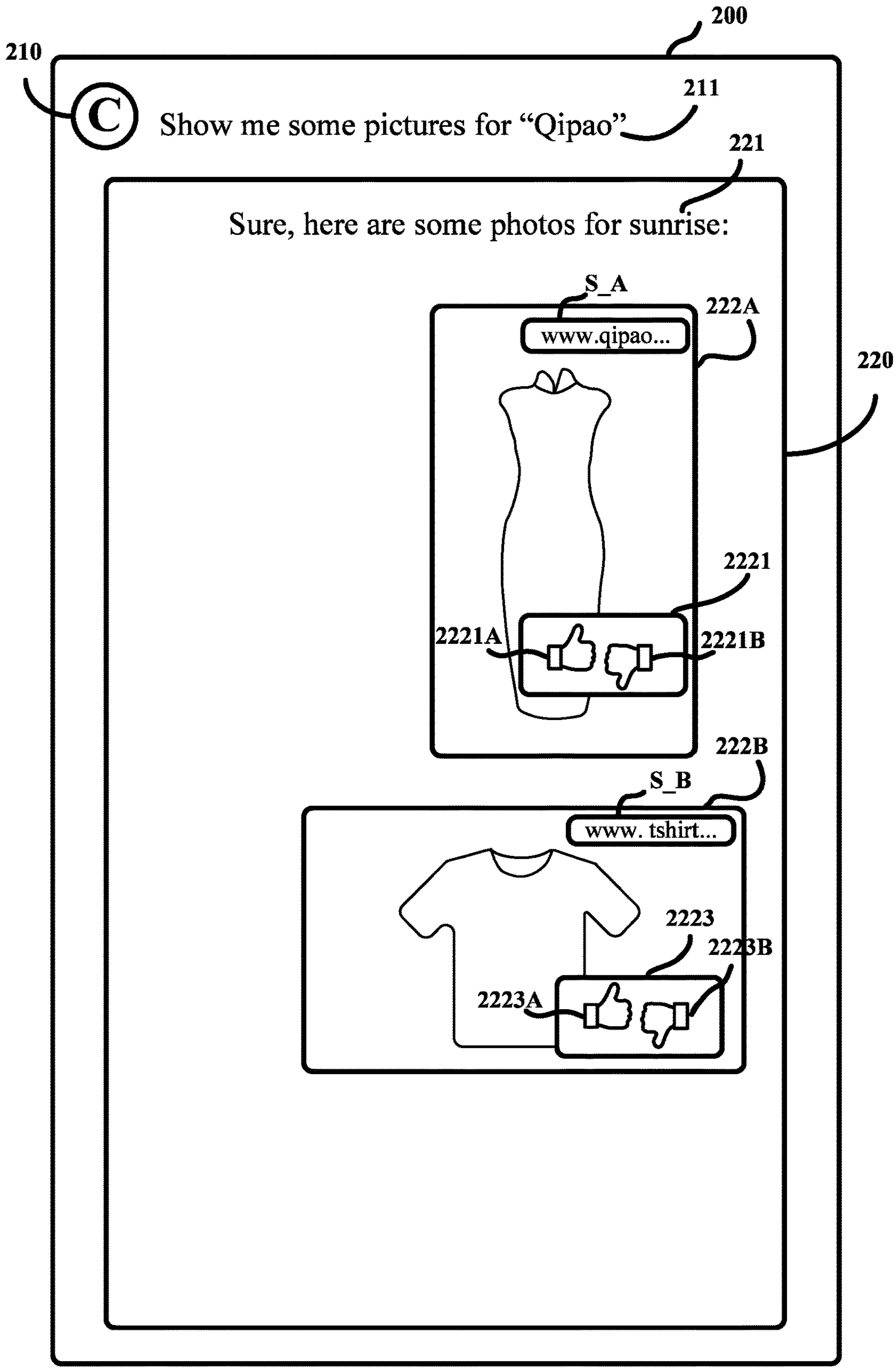
FIG. 2A depicts a non-limiting example of a user interface that shows feedback element(s) to receive user feedback for a specific portion of a response, in accordance with various implementations.
Figure 2B:
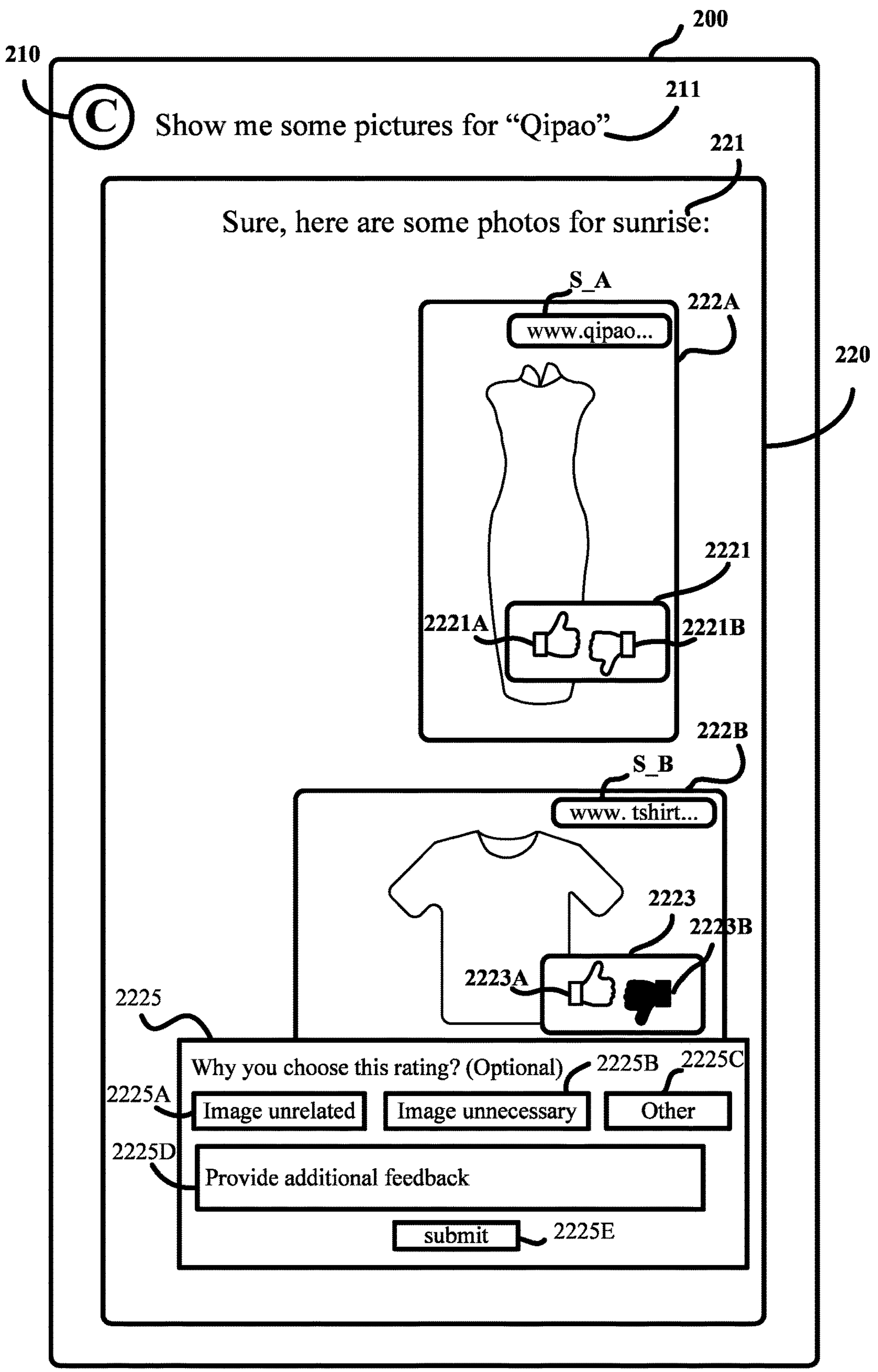
FIG. 2B depicts a non-limiting example of a user interface that shows a feedback window to receive detailed negative user feedback for a specific portion of a response, in accordance with various implementations.

FIG. 2A depicts a non-limiting example of a user interface that shows feedback element(s) to receive user feedback for a specific portion of a response, in accordance with various implementations. FIG. 2B depicts a non-limiting example of a user interface that shows a feedback window to receive detailed negative user feedback for a specific portion of a response, in accordance with various implementations.

As shown in FIG. 2A, a user C may provide a typed input 211 of "Show me some pictures for 'Qipao'" towards a client device 20. The typed input 211 can be rendered at a user interface 200 of the client device 20 (e.g., next to an icon 210 representing user C) and be used to generate an input prompt processable using a generative model (e.g., LLM 190A).

The input prompt that corresponds to the audible input of "Show me some pictures for 'Qipao'" can be processed, using the generative model to generate a generative model output from which a response 220 is generated. The response 220 can include, for instance, a textual portion 221 such as "Sure, here are some photos of Qipao". The response 220 can further include a plurality of responsive images. For instance, the response 220 can include a first responsive image 222A and/or a second responsive image 222B. The first responsive image 222A can depict a particular style of "Qipao", identify a source S_A (e.g., in the form of URL) of the first responsive image 222A, and include a graphical element 2221 that displays a first selectable element 2221A and a second selectable element 2221B. The first selectable element 2221A can be a selectable GUI element corresponding to positive user feedback for the first responsive image 222A, and the second selectable element 2221B can be a selectable GUI element corresponding to negative user feedback for the first responsive image 222A. The first selectable element 2221A, when selected, can indicate that positive user feedback is received for the first responsive image 222A. The second selectable element 2221B, when selected, can indicate that negative user feedback is received for the second responsive image 222B.

The second responsive image 222B can depict a t-shirt, identify a source S_B (e.g., in the form of URL) of the second responsive image 222B, and include a graphical element 2223 that displays a third selectable element 2223A and a fourth selectable element 2223B. The third selectable element 2223A can be a selectable GUI element corresponding to positive user feedback for the second responsive image 222B, and the fourth selectable element 2223B can be a selectable GUI element corresponding to negative user feedback for the second responsive image 222B. The third selectable element 2223A, when selected, can indicate that positive user feedback is received for the second responsive image 222B. The fourth selectable element 2223B, when selected, can indicate that negative user feedback is received for the second responsive image 222B.

Referring to FIG. 2B, a user may select the fourth selectable element 2223B, based on which, negative user feedback is determined to be received for the second responsive image 222B. In response to the fourth selectable element 2223B being selected, a feedback window 2225 (sometimes referred to as "negative feedback window") can be rendered as, for example, an overlay with respect to the response 221. The feedback window 2225 can include/display a textual description of "Why you choose this rating? (Optional)". The feedback window 2225 can include one or more selectable options such as a selectable option 2225A that corresponds to "image unrelated", a selectable option 2225B that corresponds to "image unnecessary", a selectable option 2225C that corresponds to "other". The feedback window 2225 can additionally or alternatively include an input field 2225D to receive a user description of the second image 222B.

By configuring the graphical element 2221 that displays the first selectable element 2221A and the second selectable element 2221B for the first responsive image 222A, positive or negative feedback for the first responsive image 222A can be received. By configuring the graphical element 2223 that displays the third selectable element 2223A and the fourth selectable element 2223B for the second responsive image 222B, positive or negative feedback for the second responsive image 222B can be received. In other words, user feedback for specific portion(s) of a response can be received. By further configuring the feedback window 2225 to display the one or more selectable options such as 2225A and 2225B, negative feedback for the second responsive image 222B (or other image, video, or audio) can be classified, and the generative model used to generate the response 220 can be fine-tuned (e.g., via reinforced learning as described above).

Turning now to FIG. 3, a flowchart illustrating an example method 300 of training or fine-tuning a generative model based on a user query and user feedback that evaluates a portion of a response generated in response to the user query is depicted. For convenience, the operations of the method 300 are described with reference to a system that performs the operations. This system of the method 300 includes one or more processors, memory, and/or other component(s) of computing device(s) (e.g., client device 10 of FIG. 1, computing device 510 of FIG. 5, one or more servers, and/or other computing devices). Moreover, while operations of the method 300 are shown in a particular order, this is not meant to be limiting. One or more operations may be reordered, omitted, and/or added.

At block 301, the system receives a user query, the user query being received via a user interface of a client device.

At block 303, the system generates, using a generative model, a generative response that is responsive to the user query, where the generative response includes at least media content to be rendered and one or more selectable elements to be rendered with respect to media content. The media content can be, for instance, an image or a video. In some implementations, the generative response is a multi-modal response, and the media content can be rendered as part of the multi-modal response. In this case, optionally, the multi-modal response can further include textual content. The one or more selectable elements can be rendered, for instance, as an overlay over the media content.

In some implementations, the one or more selectable elements can each be selectable and correspond to a respective type (positive or negative) of user feedback that evaluates the media content with respect to the user query. For instance, when the media content corresponds to an image, the one or more selectable elements can include a first selectable element that corresponds to positive user feedback for the media content. In this case, the one or more selectable elements can additionally or alternatively include a second selectable element that corresponds to negative user feedback for the media content.

At block 305, the system causes a response to be rendered in response to the user query, by: causing the media content to be rendered at the user interface, in response to the user query (block 305A) and/or causing the one or more selectable elements to be rendered at the user interface and with respect to the media content, in response to the user query (305B).

At block 307, the system receives user input that selects one of the one or more selectable elements.

At block 309, the system determines, based on the received user input that selects the one of the one or more selectable elements, user feedback that evaluates the media content with respect to the user query.

At block 311, the system trains or fine-tunes the generative model based on the user query and the user feedback that evaluates the media content with respect to the user query.

In some implementations, the user input selects the first selectable element that corresponds to the positive user feedback for the media content. In this case, training or fine-tuning the generative model based on the user query and the user feedback that evaluates the media content with respect to the user query can include: generating a training instance to: include an input prompt that includes the user query as a training instance input, and include at least a response having a tag or prompt utilized to obtain the media content as training instance output.

In some implementations, the method further includes: training or fine-tuning the generative model using the generated training instance. Training or fine-tuning the generative model using the generated training instance can include: processing the training instance input corresponding to the input prompt that includes the user query, using the generative model, to generate a predicted model output that includes a predicted tag or predicted prompt; comparing the predicted model output with the training instance output; and training or fine-tuning the generative model based on comparing the predicted model output with the training instance output.

In some implementations, the user input selects the second selectable element that corresponds to the negative user feedback for the media content. In this case, determining the user feedback that evaluates the media content with respect to the user query can include: causing a feedback window to be rendered at the user interface; receiving additional user input that selects one of the one or more selectable options; and determining a classification of the negative user feedback based on the additional user input. The feedback window can be rendered in response to receiving the user input that selects the second selectable element. The feedback window can include one or more selectable options each displaying a corresponding description that classifies the negative user feedback.

In some implementations, training or fine-tuning the generative model based on the user query and the user feedback that evaluates the media content with respect to the user query can include: in response to determining that the classification of the negative user feedback is a first classification, reinforcing the generative model to not output a tag utilized to obtain the media content in response to the user query.

Additionally or alternatively, training or fine-tuning the generative model based on the user query and the user feedback that evaluates the media content with respect to the user query can include, in response to determining that the classification of the negative user feedback is a second classification different from the first classification: rewriting an input prompt that is processed as input using the generative model; and training or fine-tuning the generative model using the rewritten input prompt.

In some implementations, the first classification indicates that the media content is unnecessary, and wherein the second classification indicates that the media content is unrelated to the user query.

In some implementations, the feedback window further includes an input field to receive customized user feedback.

In some implementations, the media content is non-generative media content that is obtained based on a tag generated using the generative model. The media content can be acquired by: generating, based on the tag, a query for the media content; and obtaining, based on submitting the query for the media content to a media content search system, the media content. For instance, the output of the generative model and/or the textual content may additionally, or alternatively, include multimedia content tags for non-generative media content. In these instances, based on the multimedia content tags, non-generative media content queries can be determined and be submitted over a search system (e.g., an image search system, a video search system, an audio search system, or the like) to obtain the non-generative media content. While the multimedia content tags are included in the output of the generative model and are utilized in obtaining the multimedia content, the multimedia content tags themselves may never be rendered or perceivable to the user that provided the NL based input.

In some implementations, the media content is generative media content that is obtained based on a prompt generated using the generative model. The media content can be acquired by: submitting, to an additional generative model that is in addition to the generative model, the prompt; and obtaining, based on submitting the prompt to the additional generative model, the media content.

Figure 4:
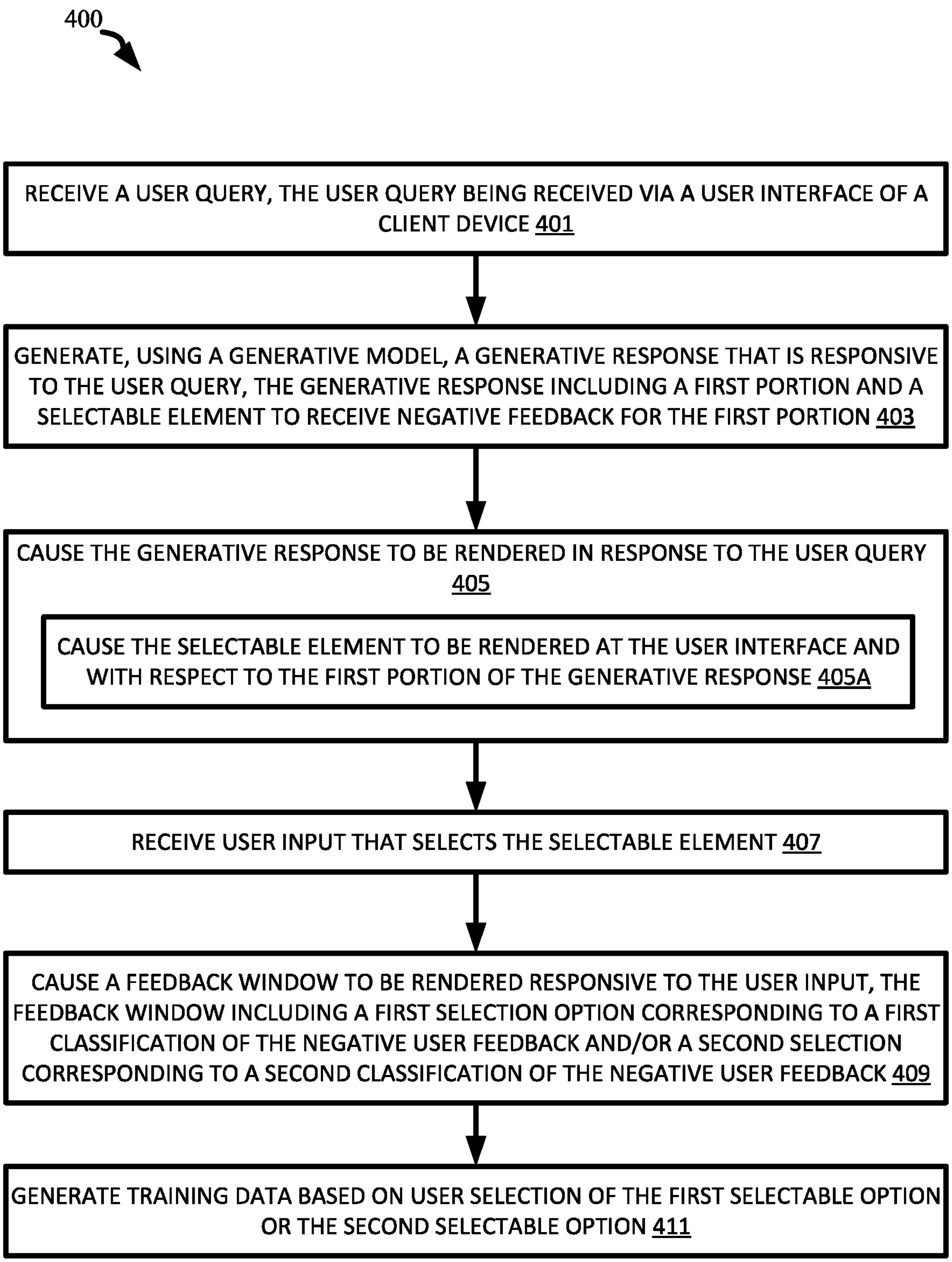
FIG. 4 depicts a flowchart illustrating another example method of training or fine-tuning a generative model based on a user query and user feedback that evaluates a portion of a response generated in response to the user query, in accordance with various implementations.

FIG. 4 depicts a flowchart illustrating another example method of generating training data for fine-tuning a generative model via reinforced learning, in accordance with various implementations. For convenience, the operations of the method 400 are described with reference to a system that performs the operations. This system of the method 300 includes one or more processors, memory, and/or other component(s) of computing device(s) (e.g., client device 10 of FIG. 1, one or more servers, and/or other computing devices). Moreover, while operations of the method 400 are shown in a particular order, this is not meant to be limiting. One or more operations may be reordered, omitted, and/or added.

As shown in FIG. 4, at block 401, the system can receive a user query, the user query being received via a user interface of a client device.

At block 403, the system can generate, using a generative model, a generative response that is responsive to the user query, the generative response including a first portion and a selectable element to receive negative feedback for the first portion.

At block 405, the system can cause the generative response to be rendered in response to the user query, which ca include, for instance, causing the selectable element to be rendered at the user interface and with respect to the first portion of the generative response (block 405A).

At block 407, the system can receive user input that selects the selectable element.

At block 409, the system can Cause a feedback window to be rendered responsive to the user input, the feedback window including a first selection option corresponding to a first classification of the negative user feedback and/or a second selection corresponding to a second classification of the negative user feedback.

At block 411, the system can Generate training data based on user selection of the first selectable option or the second selectable option.

Figure 5:
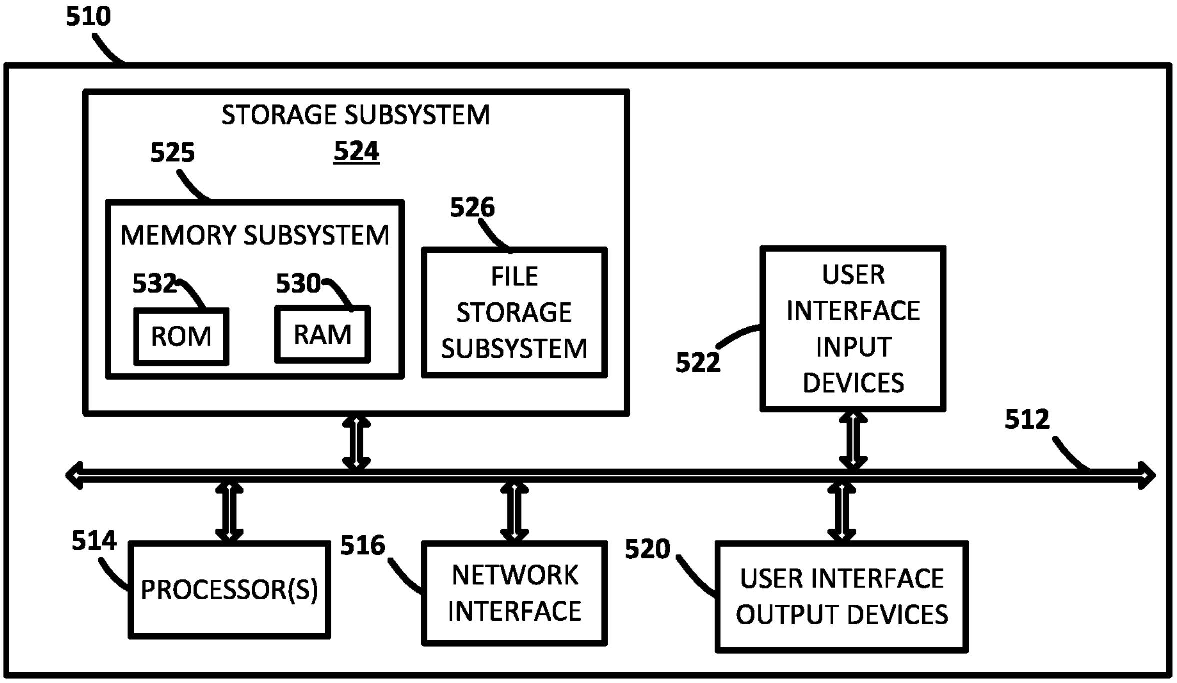
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based LLM-based assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

What is claimed is:

1. A method implemented using one or more processors, the method comprising:

receiving a user query, the user query being received via a user interface of a client device;

generating, using a generative model, a generative response that is responsive to the user query and that includes at least media content to be rendered and one or more selectable elements to be rendered with respect to media content, wherein each of the one or more selectable elements are selectable and correspond to a respective type of user feedback that evaluates the media content with respect to the user query, and wherein the one or more selectable elements includes a given selectable element that corresponds to negative user feedback;

causing the media content to be rendered at the user interface;

causing the one or more selectable elements to be rendered at the user interface and with respect to the media content;

in response to receiving user input that selects the given selectable element, of the one or more selectable elements, that corresponds to the negative user feedback:

determining, based on the received user input that selects the given selectable element, user feedback that evaluates the media content with respect to the user query, wherein determining the user feedback that evaluates the media content with respect to the user query comprises:

causing a feedback window to be rendered at the user interface, wherein the feedback window is rendered in response to receiving the user input that selects the given selectable element, and wherein the feedback window includes one or more selectable options each displaying a corresponding description that classifies the negative user feedback;

receiving additional user input that selects one of the one or more selectable options; and determining a classification of the negative user feedback based on the additional user input; and training or fine-tuning the generative model based on at least the user feedback that evaluates the media content with respect to the user query, wherein training or fine-tuning the generative model based on the user query and the user feedback that evaluates the media content with respect to the user query comprises:

in response to determining that the classification of the negative user feedback is a first classification:

reinforcing the generative model to not output a tag or prompt utilized to obtain the media content in response to the user query, and in response to determining that the classification of the negative user feedback is a second classification different from the first classification:

rewriting an input prompt that is processed as input using the generative model; and training or fine-tuning the generative model using the rewritten input prompt.

2. The method of claim 1, wherein the media content is an image or a video.

3. The method of claim 1, wherein the media content is rendered as part of a multi-modal response that is generated as the generative response and responsive to the user query, and wherein the multi-modal response further includes textual content.

4. The method of claim 1, wherein the one or more selectable elements includes an additional given selectable element that corresponds to positive user feedback.

5. The method of claim 4, further comprising:

in response to receiving user input that selects the given additional selectable element, of the one or more selectable elements, that corresponds to the positive user feedback:

generating a training instance to: include an input prompt that includes the user query as a training instance input, and include at least a response having the tag or the prompt, that was utilized to obtain the media content, as training instance output.

6. The method of claim 5, wherein training or fine-tuning the generative model based on the user query and the user feedback that evaluates the media content with respect to the user query further comprises:

processing the training instance input corresponding to the input prompt that includes the user query, using the generative model, to generate a predicted model output that includes at least a predicted tag or predicted prompt, comparing the predicted model output with the training instance output; and training or fine-tuning the generative model based on comparing the predicted model output with the training instance output.

7. The method of claim 1, wherein the first classification indicates that the media content is unnecessary or not a good quality, and wherein the second classification indicates that the media content is unrelated to the user query.

8. The method of claim 1, wherein the feedback window further includes an input field to receive customized user feedback.

9. The method of claim 1, wherein the media content is non-generative media content that is obtained based on the tag generated using the generative model.

10. The method of claim 9, further comprising:
generating, based on the tag, a query for the media content; and
obtaining, based on submitting the query for the media content to a media content search system, the media content.

11. The method of claim 1, wherein the media content is generative media content that is obtained based on the prompt, wherein the prompt is generated using the generative model.

12. The method of claim 11, further comprising:
submitting, to an additional generative model that is in addition to the generative model, the prompt; and
obtaining, based on submitting the prompt to the additional generative model, the media content.

13. A system including one or more processors and memory storing instructions that, when executed by the one or more processors, cause the one or more processors to perform operations of:
receiving a user query, the user query being received via a user interface of a client device;
generating, using a generative model, a generative response that is responsive to the user query and that includes at least media content to be rendered and one or more selectable elements to be rendered with respect to media content,
wherein each of the one or more selectable elements are selectable and correspond to a respective type of user feedback that evaluates the media content with respect to the user query, and
wherein the one or more selectable elements includes a given selectable element that corresponds to negative user feedback;
causing the media content to be rendered at the user interface;
causing the one or more selectable elements to be rendered at the user interface and with respect to the media content;
in response to receiving user input that selects the given selectable element, of the one or more selectable elements, that corresponds to the negative user feedback:
determining, based on the received user input that selects the given selectable element, user feedback that evaluates the media content with respect to the user query, wherein determining the user feedback that evaluates the media content with respect to the user query comprises:
causing a feedback window to be rendered at the user interface,
wherein the feedback window is rendered in response to receiving the user input that selects the given selectable element, and
wherein the feedback window includes one or more selectable options each displaying a corresponding description that classifies the negative user feedback;
receiving additional user input that selects one of the one or more selectable options; and
determining a classification of the negative user feedback based on the additional user input; and
training or fine-tuning the generative model based on the user query and the user feedback that evaluates the media content with respect to the user query, wherein training or fine-tuning the generative model based on the user query and the user feedback that evaluates the media content with respect to the user query comprises:
in response to determining that the classification of the negative user feedback is a first classification:
reinforcing the generative model to not output a tag or prompt utilized to obtain the media content in response to the user query, and
in response to determining that the classification of the negative user feedback is a second classification different from the first classification:
rewriting an input prompt that is processed as input using the generative model; and
training or fine-tuning the generative model using the rewritten input prompt.

14. The system of claim 13, wherein the one or more selectable elements includes an additional given selectable element that corresponds to positive user feedback.

15. The system of claim 14, wherein the instructions further cause the one or more processors to perform operations of:
in response to receiving user input that selects the given additional selectable element, of the one or more selectable elements, that corresponds to the positive user feedback:
generating a training instance to: include an input prompt that includes the user query as a training instance input, and include at least a response having the tag or the prompt, that was utilized to obtain the media content, as training instance output.

16. The system of claim 15, wherein training or fine-tuning the generative model based on the user query and the user feedback that evaluates the media content with respect to the user query further comprises:
processing the training instance input corresponding to the input prompt that includes the user query, using the generative model, to generate a predicted model output that includes at least a predicted tag or predicted prompt,
comparing the predicted model output with the training instance output; and
training or fine-tuning the generative model based on comparing the predicted model output with the training instance output.

17. The system of claim 13, wherein the first classification indicates that the media content is unnecessary or not a good quality, and wherein the second classification indicates that the media content is unrelated to the user query.

18. The system of claim 13, wherein the feedback window further includes an input field to receive customized user feedback.

19. The system of claim 13, wherein the media content is non-generative media content that is obtained based on the tag generated using the generative model.

20. A non-transitory storage medium storing instructions that, when executed by one or more processors, cause the one or more processors to perform operations of:
receiving a user query, the user query being received via a user interface of a client device;
generating, using a generative model, a generative response that is responsive to the user query and that includes at least media content to be rendered and one or more selectable elements to be rendered with respect to media content, wherein each of the one or more selectable elements are selectable and correspond to a respective type of user feedback that evaluates the media content with respect to the user query, and wherein the one or more selectable elements includes a given selectable element that corresponds to negative user feedback:

causing the media content to be rendered at the user interface;

causing the one or more selectable elements to be rendered at the user interface and with respect to the media content;

in response to receiving user input that selects the given selectable element, of the one or more selectable elements, that corresponds to the negative user feedback:

determining, based on the received user input that selects the given selectable element, user feedback that evaluates the media content with respect to the user query, wherein determining the user feedback that evaluates the media content with respect to the user query comprises:

causing a feedback window to be rendered at the user interface, wherein the feedback window is rendered in response to receiving the user input that selects the given selectable element, and wherein the feedback window includes one or more selectable options each displaying a corresponding description that classifies the negative user feedback;

receiving additional user input that selects one of the one or more selectable options; and determining a classification of the negative user feedback based on the additional user input; and training or fine-tuning the generative model based on at least the user feedback that evaluates the media content with respect to the user query, wherein training or fine-tuning the generative model based on the user query and the user feedback that evaluates the media content with respect to the user query comprises:

in response to determining that the classification of the negative user feedback is a first classification:

reinforcing the generative model to not output a tag or prompt utilized to obtain the media content in response to the user query, and in response to determining that the classification of the negative user feedback is a second classification different from the first classification:

rewriting an input prompt that is processed as input using the generative model; and training or fine-tuning the generative model using the rewritten input prompt.

* * * * *